United States Patent
Thoppai et al.

(10) Patent No.: US 8,078,816 B1
(45) Date of Patent: Dec. 13, 2011

(54) TRANSPARENT TRANSFER OF QTREE AND QUOTA METADATA IN CONJUNCTION WITH LOGICAL REPLICATION OF USER DATA

(75) Inventors: Omprakaash C. Thoppai, Seven Fields, PA (US); Umeshkumar V. Rajasekaran, Cranberry Township, PA (US); Alan Stuart Driscoll, Fremont, CA (US); Devang Shah, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 399 days.

(21) Appl. No.: 12/419,976

(22) Filed: Apr. 7, 2009

(51) Int. Cl.
*G06F 13/00* (2006.01)
*G06F 13/28* (2006.01)

(52) U.S. Cl. .. 711/162; 711/163; 711/172; 711/E12.103
(58) Field of Classification Search .................. 711/162, 711/163, 172, E12.103
See application file for complete search history.

(56) References Cited

U.S. PATENT DOCUMENTS

| | | | |
|---|---|---|---|
| 5,390,318 A * | 2/1995 | Ramakrishnan et al. | 711/158 |
| 7,089,284 B2 * | 8/2006 | Pardikar et al. | 709/203 |
| 7,900,015 B2 * | 3/2011 | Fachan et al. | 711/172 |
| 2006/0095705 A1 * | 5/2006 | Wichelman et al. | 711/171 |
| 2009/0288084 A1 * | 11/2009 | Astete et al. | 718/1 |
| 2010/0094999 A1 * | 4/2010 | Rama et al. | 709/225 |

* cited by examiner

*Primary Examiner* — Ly D Pham
(74) *Attorney, Agent, or Firm* — Perkins Coie LLP

(57) ABSTRACT

A technique that provides the ability to copy or move a volume that includes one or more quota structures, by using logical replication, where the volume and any quota structures in it are immediately accessible upon completion of the copy/move operation, and where the quota structures' usage control functionality is immediately functional and reliable upon completion of the copy/move operation. A user does not have to reinitialize the quota mechanism or invoke a quota scanner at the destination.

21 Claims, 18 Drawing Sheets

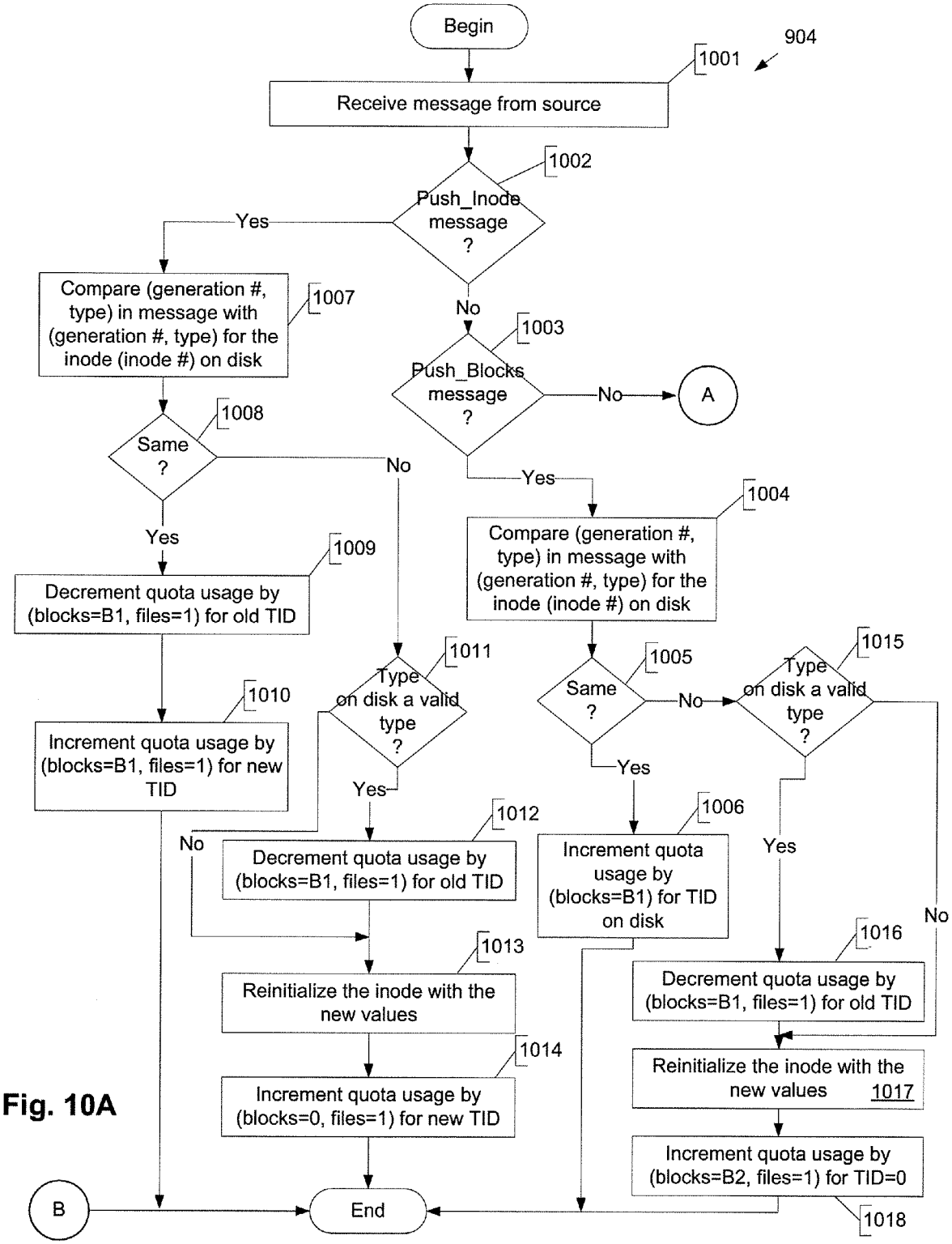

us 8,078,816 B1

TRANSPARENT TRANSFER OF QTREE AND QUOTA METADATA IN CONJUNCTION WITH LOGICAL REPLICATION OF USER DATA

FIELD OF THE INVENTION

At least one embodiment of the present invention pertains to network storage systems, and more particularly, to a technique for transparent transfer of qtree and quota metadata with logical replication of user data.

BACKGROUND

A network storage controller is a processing system that is used to store and retrieve data on behalf of one or more hosts on a network. A storage server is a type of storage controller that operates on behalf of one or more clients on a network, to store and manage data in a set of mass storage devices, such as magnetic or optical storage-based disks or tapes. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other storage servers are capable of servicing both file-level requests and block-level requests, as is the case with certain storage servers made by NetApp®, Inc. of Sunnyvale, Calif.

In at least one implementation, a storage server or server cluster makes data available to a client (host) system by presenting or exporting one or more volumes, or one or more logical containers of data referred to herein as quota trees ("qtrees"), to the client systems. A "volume" is a logical data set which is an abstraction of physical storage, combining one or more physical mass storage devices (e.g., disks) or parts thereof into a single logical storage object, and which is managed as a single administrative unit, such as a single file system. A "file system" is a structured (e.g., hierarchical) set of stored logical containers of data (e.g., volumes, LUNs, directories, files), which does not have to include or have its storage based on "files" per se.

From the perspective of a client system, each volume can appear to be a single disk drive. However, each volume can represent the storage space in a single physical storage device, a redundant array of independent disks (RAID) or a RAID group, an aggregate of some or all of the storage space in multiple physical storage devices, or any other suitable set of storage space. An "aggregate" is a logical aggregation of physical storage; i.e., a logical container for a pool of storage, combining one or more physical mass storage devices (e.g., disks) or parts thereof into a single logical storage object, which contains or provides storage for one or more other logical data sets at a higher level of abstraction (e.g., volumes).

A "qtree" is a quota structure, which is a logical container of data that has a mechanism for controlling consumption of storage space. In certain storage servers a qtree is implemented as a top-level directory within a volume, where such directory has special properties (e.g., quota rules) for managing its storage space and/or file consumption for one or more specific users or user groups, for example.

While qtrees are a useful mechanism for limiting storage device usage and file usage, they can present problems with regard to certain types of storage system operations, such as certain operations for mirroring, copying or moving a volume. For example, it may be desirable to have the capability to copy or move a volume from one file system to another, or from one aggregate to another. Further, it may be desirable to accomplish the operation by using logical replication of user data, as opposed to using physical replication at the block level within the file system. Logical replication is replication in which the replicated data set has the identical logical structure as the original data set but does not necessarily have the same physical structure (i.e., at the block level of a file system) as the original data set (a "block" in this context is the smallest addressable unit of contiguous data used by a given file system to manipulate and transfer data, which is commonly though not necessarily 4 kbytes in size). It may be desirable to use logical replication instead of a physical block level replication, because that way a volume or other type of data set can be copied or moved notwithstanding differences in the file system formats and structures at the source and the destinations.

However, logical replication presents a problem when the volume being moved (or copied) includes one or more qtrees on which quotas are being enforced. In order to have reliable control of file or block usage in a qtree, an up-to-date accounting of file usage and block usage by the qtree needs to be maintained. Such an accounting is generated by scanning a volume that contains a qtree to determine its file and block usage, and the element which performs this scanning function in the storage server is called a quota scanner. However, if the file system or aggregate used at the destination is of a different type or format than the file system at the source, the quota accounting generated at the source may not be valid for the destination. For example, the source aggregate may be a 32-bit aggregate while the destination aggregate is a 64-bit aggregate, or vice versa. As another example, the source file system may be a FlexVol® type file system while the destination file system is a striped file system (FlexVol is a trademark of NetApp, Inc.).

One way to handle this problem would be to rescan the volume that contains the qtree after the volume move operation is complete, to generate a new quota accounting at the destination. However, it can take a long time to complete such a scan—potentially hours or days, depending on the size of the volume—during which the qtree's usage control functionality is not available. Consequently, the volume move operation can cause a significant and prolonged service disruption to administrative users who want to limit the qtree's block/file usage. That is, while the data is immediately available to the client users, the file system consumption is not being controlled immediately after the move. This situation is particularly undesirable when a volume move is desired to be "transparent", i.e., where a user does not perceive any interruption in access to the volume and is not required to unmount the volume at the source and remount it at the destination.

SUMMARY

The technique introduced here provides the ability to copy or move a volume that includes one or more quota structures, such as qtrees, by using logical replication, where the volume and any quota structures it includes are immediately accessible upon completion of the copy/move operation, and where the quota structures' usage control functionality is immediately functional and reliable upon completion of the copy/move operation. (In this context, a move operation can be considered just a special type of copy operation, i.e., one in which the copy at the source volume is deleted at the end of the operation. Therefore, references to "copy" and "move" in this document are not to be interpreted as mutually exclusive). The latest quota rules from the source volume are applied to the destination volume. The user does not have to reinitialize the quota mechanism or invoke a quota scanner at the destination after the copy/move operation has completed. Further, a user does not have to unmount the volume at the source and remount it at the destination. As such, the entire volume copy/move operation is transparent to the user, at least to the extent there is effectively no disruption in access to the volume and its included qtrees.

Briefly described, the technique sends at least some quota metadata from the source to the destination separately from the user data being replicated. The destination dynamically creates and updates its own quota accounting of the volume being copied, based on the user data and quota metadata it receives as part of a logical replication. In some cases this involves making corrections to the quota accounting on the destination, as in some instances the quota metadata may be received at the destination out of order relative to its corresponding user data. Nonetheless, the technique introduced here allows for such instances, such that at the end of the process, all of the quota metadata, including the quota rule, quota state and quota accounting, are current (i.e., up-to-date and correct) at the destination.

The technique in one embodiment includes a method which includes storing a data set, such as a volume, at a source in a network storage controller in a network storage system, and implementing a quota mechanism (e.g., a qtree) in the data set at the source to control usage of storage space by the data set. The quota mechanism includes a quota state, one or more quota rules and a quota accounting of the data set at the source. The method further includes executing a copy/move operation, which includes performing a logical replication of the data set from the source to the destination, and automatically implementing the quota mechanism for the data set at the destination so that upon completion of the copy/move operation the quota state, the quota rule and the quota accounting of the data set are in effect and up-to-date at the destination. In this context, "automatically" means that the action being referred to is done without any explicit (administrative) user command/request to perform that action.

Automatically implementing the quota mechanism for the data set at the destination can include dynamically creating and updating the destination quota accounting of the data set at the destination in response to receiving, at the destination, data of the data set at the source, as part of the logical replication of the data set (which may include one or more "snapshots", i.e., persistent point-in-time images of the data set). "Dynamically" in this context means that the creation and updating of the quota accounting at the destination occurs as the user data (blocks) and user data's metadata (inode information) are received at the destination from the source. More specifically, this operation can include adding block and file count to a new quota structure (e.g., qtree) at the destination.

In one embodiment, after the destination receives blocks of the data set from the source and updates the destination quota accounting of the data set, it then receives metadata attributes of the blocks and corrects the destination quota accounting based on the metadata attributes. Correcting the quota accounting at the destination can include debiting (subtracting) the number of blocks from the first quota structure and crediting (adding) the number of blocks to a second quota structure (e.g., qtree) associated with the data set, based on the metadata attributes.

By virtue of the use of logical replication, the file system and/or aggregate that contain the data set at the source can be different from the file system and/or aggregate (respectively) at the destination, without adversely affecting the move operation or the qtree functionality. For example, if a particular file consumed 100 blocks on the source file system based on its format, and if the same file were to consume 50 blocks on the destination file system, the quota accounting technique introduced here will handle this situation automatically and correctly, since the accounting is dynamic.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIGS. 10A and 10B collectively show the details of creating/updating the destination quota accounting, according to an embodiment of the technique introduced here;

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

System Environment

Figure 1:
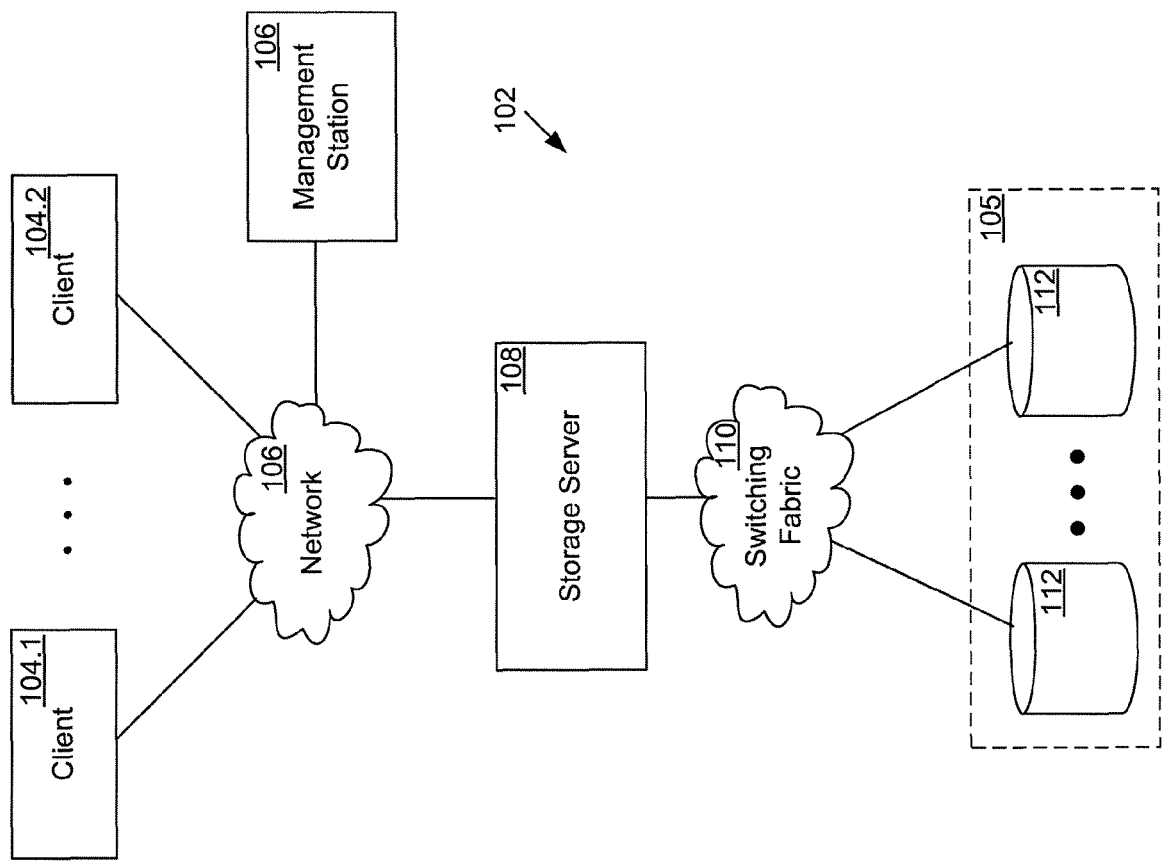
FIG. 1 illustrates a network storage environment in which the present invention can be implemented.
Figure 2:
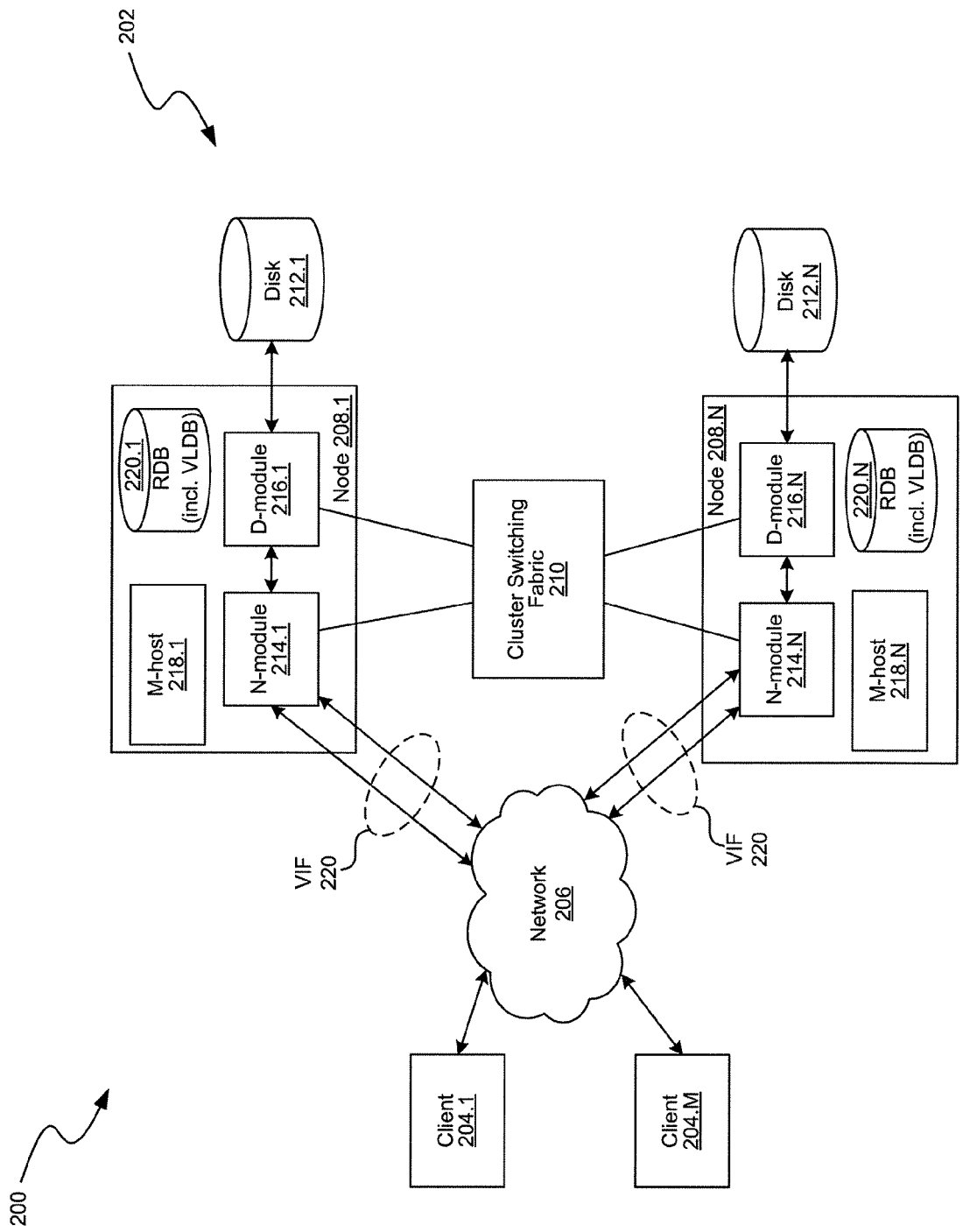
FIG. 2 illustrates a clustered network storage environment in which the present invention can be implemented.

FIGS. 1 and 2 show at different levels of detail, a network configuration in which the technique introduced here can be implemented. In particular, FIG. 1 shows a network data storage environment, which includes a plurality of client systems 104.1-104.2, a storage server system 102, and computer network 106 connecting the client systems 104.1-104.2 and the storage server system 102. As shown in FIG. 1, the storage server system 102 includes a storage server 108, a switching fabric 110, and a number of mass storage devices 112, such as disks, in a mass storage subsystem 105. Alternatively, some or all of the mass storage devices 212 can be other types of storage, such as flash memory, solid-state drives (SSDs), tape storage, etc.

The storage server 108 may be, for example, one of the FAS-xxx family of storage server products available from NetApp, Inc. The client systems 104.1-104.2 are connected to the storage server 108 via the computer network 106, which can be a packet-switched network, for example, a local area network (LAN) or wide area network (WAN). Further, the storage server 108 is connected to the disks 112 via a switching fabric 110, which can be a fiber distributed data interface (FDDI) network, for example. It is noted that, within the network data storage environment, any other suitable numbers of storage servers and/or mass storage devices, and/or any other suitable network technologies, may be employed.

The storage server 108 can make some or all of the storage space on the disk(s) 112 available to the client systems 104.1-104.2 in a conventional manner. For example, each of the disks 112 can be implemented as an individual disk, multiple disks (e.g., a RAID group) or any other suitable mass storage device(s). The storage server 108 can communicate with the client systems 104.1-104.2 according to well-known protocols, such as the Network File System (NFS) protocol or the Common Internet File System (CIFS) protocol, to make data stored on the disks 112 available to users and/or application programs. The storage server 108 can present or export data stored on the disk 112 as volumes and/or qtrees, to each of the client systems 104.1-104.2.

Various functions and configuration settings of the storage server 108 and the mass storage subsystem 105 can be controlled from a management station 106 coupled to the network 106. Among other operations, a volume move such as described herein can be initiated from the management station 106.

FIG. 2 depicts a network data storage environment, which can represent a more detailed view of the environment in FIG. 1. The environment 200 includes a plurality of client systems 204 (204.1-204.M), a clustered storage server system 202, and a computer network 206 connecting the client systems 204 and the clustered storage server system 202. As shown in FIG. 2, the clustered storage server system 202 includes a plurality of server nodes 208 (208.1-208.N), a cluster switching fabric 210, and a plurality of mass storage devices 212 (212.1-212.N), which can be disks, as henceforth assumed here to facilitate description. Alternatively, some or all of the mass storage devices 212 can be other types of storage, such as flash memory, SSDs, tape storage, etc.

Each of the nodes 208 is configured to include several modules, including an N-module 214, a D-module 216, and an M-host 218 (each of which can be implemented by using a separate software module) and an instance of a replicated database (RDB) 220. Specifically, node 208.1 includes an N-module 214.1, a D-module 216.1, and an M-host 218.1; node 208.N includes an N-module 214.N, a D-module 216.N, and an M-host 218.N; and so forth. The N-modules 214.1-214.M include functionality that enables nodes 208.1-208.N, respectively, to connect to one or more of the client systems 204 over the network 206, while the D-modules 216.1-216.N provide access to the data stored on the disks 212.1-212.N, respectively. The M-hosts 218 provide management functions for the clustered storage server system 202. Accordingly, each of the server nodes 208 in the clustered storage server arrangement provides the functionality of a storage server.

The RDB 220 is a database that is replicated throughout the cluster, i.e., each node 208 includes an instance of the RDB 220. The various instances of the RDB 220 are updated regularly to bring them into synchronization with each other. The RDB 220 provides cluster-wide storage of various information used by all of the nodes 208, including a volume location database (VLDB) (not shown). The VLDB is a database that indicates the location within the cluster of each volume in the cluster (i.e., the owning D-module 216 for each volume) and is used by the N-modules 214 to identify the appropriate D-module 216 for any given volume to which access is requested.

The nodes 208 are interconnected by a cluster switching fabric 210, which can be embodied as a Gigabit Ethernet switch, for example. The N-modules 214 and D-modules 216 cooperate to provide a highly-scalable, distributed storage system architecture of a clustered computing environment implementing exemplary embodiments of the present invention. Note that while there is shown an equal number of N-modules and D-modules in FIG. 2, there may be differing numbers of N-modules and/or D-modules in accordance with various embodiments of the technique described here. For example, there need not be a one-to-one correspondence between the N-modules and D-modules. As such, the description of a node 208 comprising one N-module and one D-module should be understood to be illustrative only.

Figure 3:
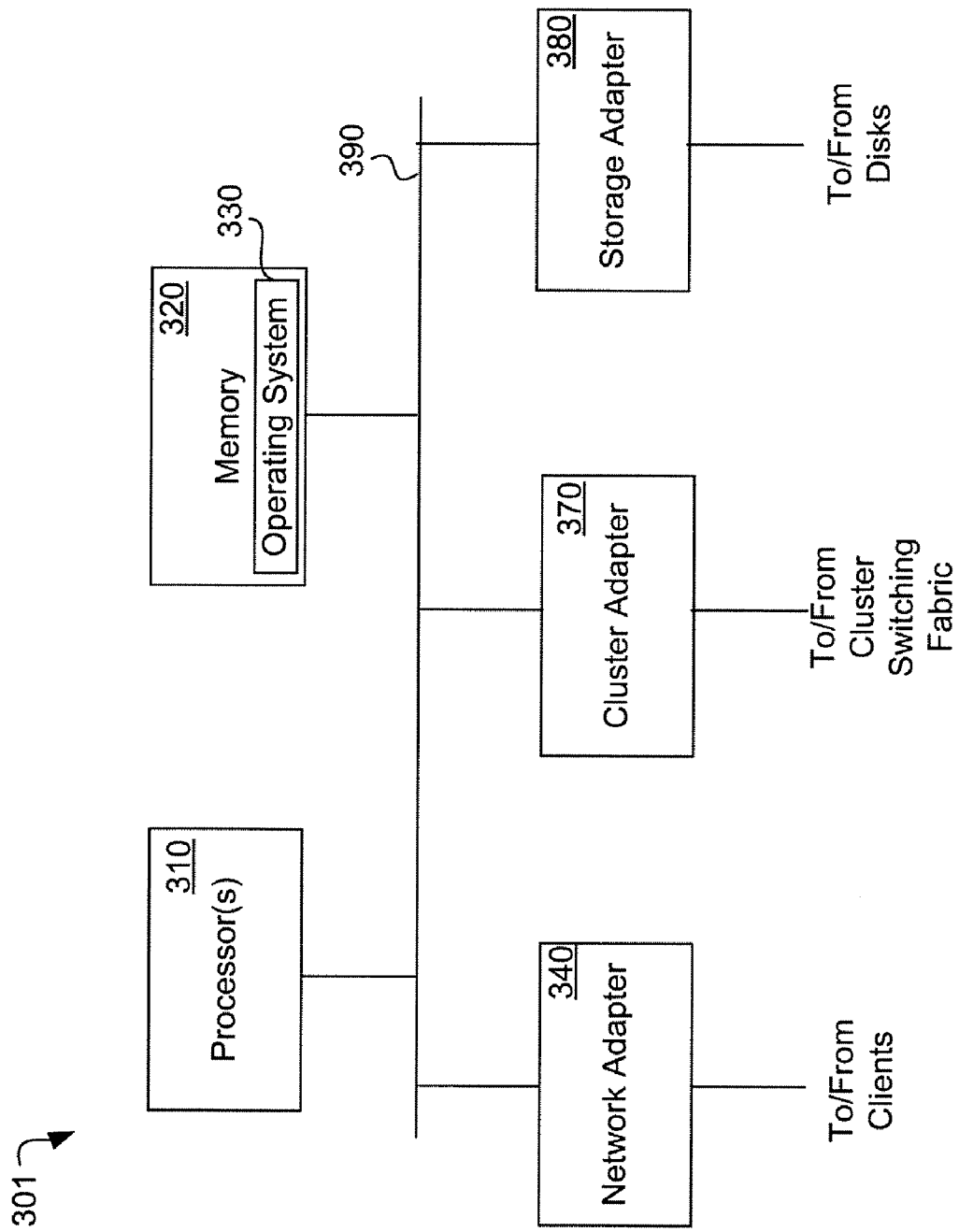
FIG. 3 is a high-level block diagram showing an example of the hardware architecture of a storage controller that can implement one or more storage server nodes.

FIG. 3 is a diagram illustrating an example of a storage controller that can implement one or more of the storage server nodes 208. In an exemplary embodiment, the storage controller 301 includes a processor subsystem that includes one or more processors. The storage controller 301 further includes a memory 320, a network adapter 340, a cluster access adapter 370 and a storage adapter 380, all interconnected by an interconnect 390. The cluster access adapter 370 includes a plurality of ports adapted to couple the node 208 to other nodes 208 of the cluster. In the illustrated embodiment, Ethernet is used as the clustering protocol and interconnect media, although other types of protocols and interconnects may be utilized within the cluster architecture described herein. In alternative embodiments where the N-modules and D-modules are implemented on separate storage systems or computers, the cluster access adapter 270 is utilized by the N-module 214 and/or D-module 216 for communicating with other N-modules and/or D-modules of the cluster.

The storage controller 301 can be embodied as a single- or multi-processor storage system executing a storage operating system 330 that preferably implements a high-level module, such as a storage manager, to logically organize the information as a hierarchical structure of named directories, files and special types of files called virtual disks (hereinafter generally "blocks") on the disks. Illustratively, one processor 310 can execute the functions of the N-module 214 on the node 208 while another processor 310 executes the functions of the D-module 216.

The memory 320 illustratively comprises storage locations that are addressable by the processors and adapters 340, 370, 380 for storing software program code and data structures associated with the present invention. The processor 310 and adapters may, in turn, comprise processing elements and/or logic circuitry configured to execute the software code and manipulate the data structures. The storage operating system 330, portions of which is typically resident in memory and executed by the processing elements, functionally organizes the storage controller 301 by (among other things) invoking storage operations in support of the storage service provided by the node 208. It will be apparent to those skilled in the art that other processing and memory implementations, including various computer readable storage media, may be used for storing and executing program instructions pertaining to the technique introduced here.

The network adapter 340 includes a plurality of ports to couple the storage controller 301 to one or more clients 204 over point-to-point links, wide area networks, virtual private networks implemented over a public network (Internet) or a shared local area network. The network adapter 340 thus can include the mechanical, electrical and signaling circuitry needed to connect the storage controller 301 to the network 206. Illustratively, the network 206 can be embodied as an Ethernet network or a Fibre Channel (FC) network. Each client 204 can communicate with the node 208 over the network 206 by exchanging discrete frames or packets of data according to pre-defined protocols, such as TCP/IP.

The storage adapter 380 cooperates with the storage operating system 330 to access information requested by the clients 204. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on disks 212. The storage adapter 380 includes a plurality of ports having input/output (I/O) interface circuitry that couples to the disks over an I/O interconnect arrangement, such as a conventional high-performance, Fibre Channel (FC) link topology.

Storage of information on disks 212 can be implemented as one or more storage volumes that include a collection of physical storage disks cooperating to define an overall logical arrangement of volume block number (VBN) space on the volume(s). The disks 212 can be organized as a RAID group. One or more RAID groups together form an aggregate. An aggregate can contain one or more volumes/file systems.

The storage operating system 330 facilitates clients' access to data stored on the disks 212. In certain embodiments, the storage operating system 330 implements a write-anywhere file system that cooperates with one or more virtualization modules to "virtualize" the storage space provided by disks 212. In certain embodiments, a storage manager 460 (FIG. 4) logically organizes the information as a hierarchical structure of named directories and files on the disks 212. Each "on-disk" file may be implemented as set of disk blocks configured to store information, such as data, whereas the directory may be implemented as a specially formatted file in which names and links to other files and directories are stored. The virtualization module(s) allow the storage manager 460 to further logically organize information as a hierarchical structure of blocks on the disks that are exported as named logical unit numbers (LUNs).

In the illustrative embodiment, the storage operating system 330 is a version of the Data ONTAP® operating system available from NetApp, Inc. and the storage manager 460 implements the Write Anywhere File Layout (WAFL®) file system. However, other storage operating systems are capable of being enhanced for use in accordance with the principles described herein.

Figure 4:
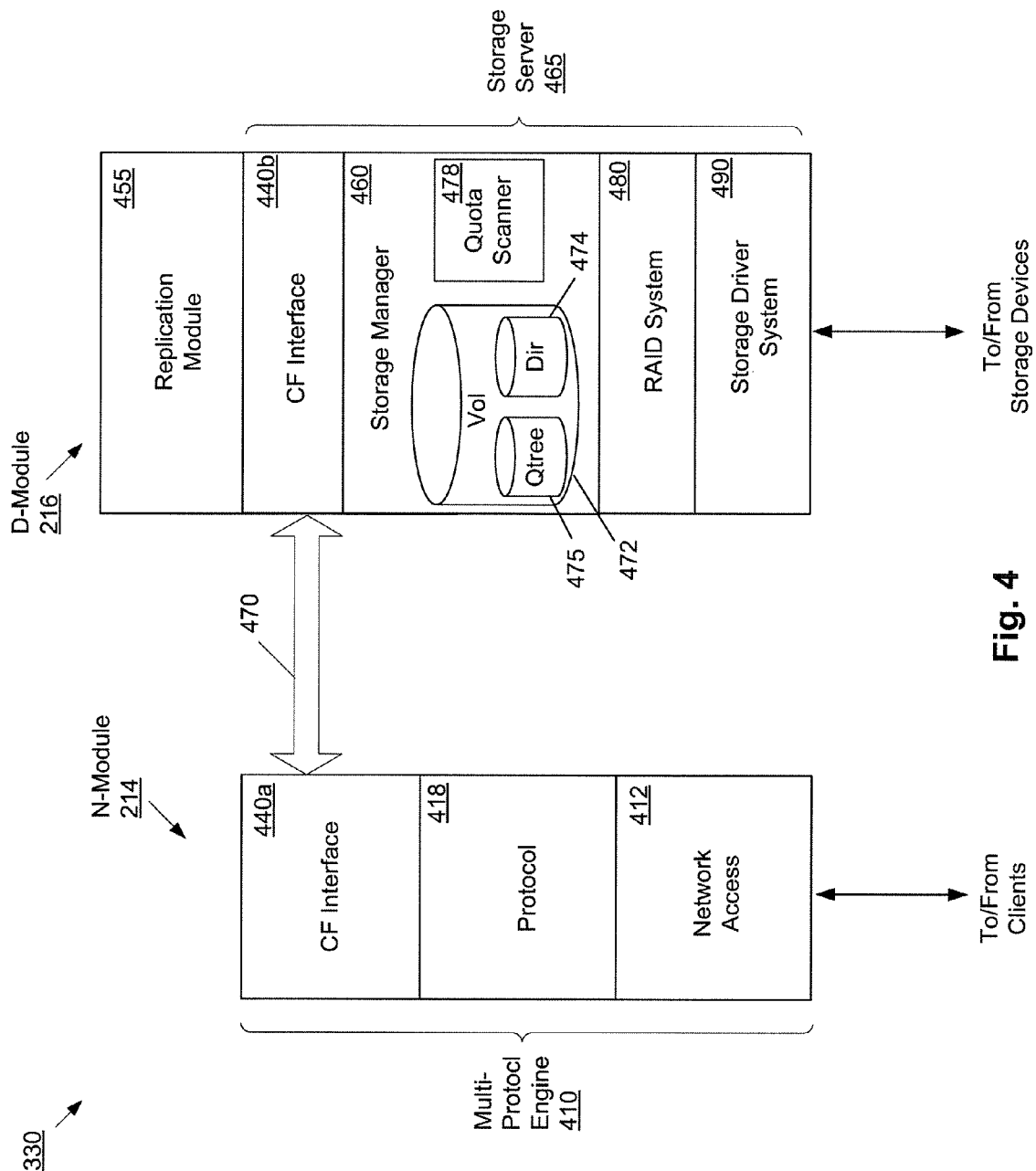
FIG. 4 illustrates an example of a storage operating system of a storage server node.

FIG. 4 is a diagram illustrating an example of storage operating system 330 that can be used with the technique introduced here. In the illustrated embodiment the storage operating system 330 includes multiple functional layers organized to form an integrated network protocol stack or, more generally, a multi-protocol engine 410 that provides data paths for clients to access information stored on the node using block and file access protocols. The multiprotocol engine 410 also forms the N-module 214 in combination with underlying processing hardware. The multi-protocol engine 410 includes a network access layer 412 which includes one or more network drivers that implement one or more lower-level protocols to enable the processing system to communicate over the network 206, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The multiprotocol engine 410 also includes a protocol layer which implements various higher-level network protocols, such as Network File System (NFS), Common Internet File System (CIFS), Hypertext Transfer Protocol (HTTP), Internet small computer system interface (iSCSI), etc. Further, the multiprotocol engine 410 includes a cluster fabric (CF) interface module 440a which implements intra-cluster communication with D-modules and with other N-modules.

In addition, the storage operating system 330 includes a set of layers organized to form a storage server 465 that provides data paths for accessing information stored on the disks 212 of the node 208. The storage server 465 also forms the D-module 216 in combination with underlying processing hardware. To that end, the storage server 465 includes a storage manager module 460 that manages any number of volumes 472, a RAID system module 480 and a storage driver system module 490. At least one of the volumes 472 includes at least one qtree 475 and at least one standard directory 474.

The storage manager 460 primarily manages a file system (or multiple file systems) and serves client-initiated read and write requests. The storage manager 460 includes a quota scanner 478, which can scan any volume 472 that has a qtree 475 and whose quota state is ON, to generate a quota accounting. More specifically, the quota scanner 478 counts and maintains statistics on the number of files and blocks used by each qtree in a given volume 472. The RAID system 480 manages the storage and retrieval of information to and from the volumes/disks in accordance with a RAID redundancy protocol, such as RAID-4, RAID-5, or RAID-DP, while the disk driver system 490 implements a disk access protocol such as SCSI protocol or FCP.

The storage server 465 also includes a CF interface module 440b to implement intra-cluster communication 470 with N-modules and/or other D-modules. The CF interface modules 440a and 440b can cooperate to provide a single file system image across all D-modules 216 in the cluster. Thus, any network port of an N-module 214 that receives a client request can access any data container within the single file system image located on any D-module 216 of the cluster.

The storage server 465 further includes a replication module 455, which includes the ability to perform logical replication of any volume. In doing so, the replication module 455 can perform the replication operations of either the source or the destination (or as both if the source and destination are on the same D-module 216).

The CF interface modules 440 implement the CF protocol to communicate file system commands among the modules of cluster over the cluster switching fabric 210 (FIG. 2). Such communication can be effected by a D-module exposing a CF application programming interface (API) to which an N-module (or another D-module) issues calls. To that end, a CF interface module 440 can be organized as a CF encoder/decoder. The CF encoder of, e.g., CF interface 440a on N-module 214 can encapsulate a CF message as (i) a local procedure call (LPC) when communicating a file system command to a D-module 216 residing on the same node or (ii) a remote procedure call (RPC) when communicating the command to a D-module residing on a remote node of the cluster. In either case, the CF decoder of CF interface 440b on D-module 216 de-encapsulates the CF message and processes the file system command.

In operation of a node 208, a request from a client 204 is forwarded as a packet over the network 206 and onto the node 208, where it is received at the network adapter 340 (FIG. 3). A network driver of layer 412 processes the packet and, if appropriate, passes it on to a network protocol and file access layer for additional processing prior to forwarding to the storage manager 460. At that point, the storage manager 460 generates operations to load (retrieve) the requested data from disk 212 if it is not resident in memory 320. If the information is not in memory 320, the storage manager 460 indexes into a metadata file to access an appropriate entry and retrieve a logical VBN. The storage manager 460 then passes a message structure including the logical VBN to the RAID system 480; the logical VBN is mapped to a disk identifier and disk block number (DBN) and sent to an appropriate driver (e.g., SCSI) of the disk driver system 490. The disk driver accesses the DBN from the specified disk 212 and loads the requested data block(s) in memory for processing by the node. Upon completion of the request, the node (and operating system) returns a reply to the client 204 over the network 206.

The data request/response "path" through the storage operating system 330 as described above can be implemented in general-purpose programmable hardware executing the storage operating system 330 as software or firmware. Alternatively, it can be implemented at least partially in specially designed hardware. That is, in an alternate embodiment of the invention, some or all of the storage operating system 330 is implemented as logic circuitry embodied within a field programmable gate array (FPGA) or an application specific integrated circuit (ASIC), for example.

The N-module 214 and D-module 216 can be implemented as processing hardware configured by separately-scheduled processes of storage operating system 330; however, in an alternate embodiment, the modules may be implemented as processing hardware configured by code within a single operating system process. Communication between an N-module 214 and a D-module 216 is thus illustratively effected through the use of message passing between the modules although, in the case of remote communication between an N-module and D-module of different nodes, such message passing occurs over the cluster switching fabric 210. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF API.

Volume Copy/Move

While the technique introduced here is described in the context of a volume move operation, it is to be understood that the technique is also potentially applicable to other types of operations that involve copying data with associated quotas, such as data protection mirroring and replication for load sharing, for example.

The technique can be used in conjunction with a so-called "transparent" volume move operation, in which users do not perceive any interruption in access to the volume and a user is not required to unmount the volume at the source and remount it at the destination, that is, the volume move operation is transparent to the user. To that extent, the quota mechanism described herein serves to facilitate the transparency of a volume move operation.

During a transparent volume move operation, according to one embodiment, client write requests continue to be targeted at the source volume, while the data from the source is replicated to the destination. When the replication process gets closer in time to the active filesystem, the replication module 455 reaches the final stage of the move, in which the source volume is quiesced (i.e., no write operations from clients are allowed), as discussed below. During this quiesced time, write operations are failed with a special error code that will only cause the N-module that received the write request to retry the operation without sending a failure message back to the requesting client. In the final stage of the volume move, a final snapshot of the source volume is taken to capture the final changes in the active filesystem and is replicated to the destination. Once this is done, the VLDB is updated indicating that access to this volume should henceforth target the new volume. After the VLDB update the N-module which is retrying the client operation accesses the relocated volume and replies to the client. Thus, while the clients may notice a temporary delay in response (while the N-blade is retrying operations), the file system at all times is available to the clients, thereby making the volume move "transparent".

As noted above, the storage server 465 (FIG. 4) includes a replication module 455, which can perform logical replication of a volume, either as part of a copy operation or a move operation. Replication can accomplished by communicating user data and metadata between two different D-modules 216 (i.e., a source D-module and a destination D-module), each of which includes a replication module 455. The copy or move operation may involve copying or moving a volume from one type of aggregate to a different type of aggregate (e.g., a 32-bit aggregate to a 64-bit aggregate, or vice versa). Likewise, the copy or move operation may involve copying or moving a volume from one type of file system to another type of file system (e.g., from a FlexVol file system to a striped file system, or vice versa). Note that while the technique is described in the context of a clustered system, such as shown in FIG. 2, it can also be used in a non-clustered system.

In accordance with the technique introduced here, logical replication is used to copy or move a volume, rather than physical replication. Logical replication is replication in which the replicated (destination) data set has the identical logical structure as the original (source) data set but does not necessarily have the same physical structure (i.e., at the block level of a file system) as the original data set. In this context, logical replication ensures only that, for corresponding data on the source and destination: 1) the mode number is the same (ii) the mode attributes are same (iii) for files, the mode's contents, i.e., level-0 block data is same, and (iv) directory entries are logically identical; other attributes may be different between the source and destination for corresponding data. This is in contrast with physical replication at the block level of the file system.

To understand the difference, first note that in certain storage systems, each data block in a volume can be represented by both a physical block identified by a physical block pointer, and a logical block identified by a corresponding logical block pointer. In the illustrative embodiments described here, a given block of data has both a logical block pointer and a physical block pointer, which refer to the same data. However, the physical block pointer indicates the actual physical location of the data block on a storage medium, whereas the logical block pointer indicates the logical position of the data block within the data set (e.g., a file) relative to other data blocks. In one embodiment, a logical block pointer is a block pointer that is used by the RAID system 480 (FIG. 4) and the storage manager 460, for communication between those two elements; whereas a physical block pointer is a block pointer that is used by the RAID system 480 and the storage driver system 490 for communication between those two elements.

In a system such as this, with physical replication at the block level, the replication process creates a copy that has the identical structure of physical block pointers as the original data set. With logical replication, the copy has the identical structure of logical block pointers as the original data set but may (and typically does) have a different structure of physical block pointers than the original data set.

However, logical replication presents a problem when the volume being moved (or copied) includes one or more qtrees with quotas enforced. To have reliable control of file or block usage in a qtree, an up-to-date accounting of file usage and block usage by the qtree needs to be maintained. However, if the file system or aggregate used at the destination is of a different type or format than the file system at the source, the quota accounting generated at the source may not be valid for the destination.

The technique introduced here overcomes this problem, however, such that at the end of the copy operation, all of the quota metadata for any qtree in the volume being moved, including the quota state, the quota rule and the quota accounting of the data set, are in effect and up-to-date at the destination. As such, the quotas do not have to be initialized at the destination—they will be enforced and current immediately upon completion of the move operation.

Briefly described, the technique sends at least some quota metadata from the source to the destination separately from the user data being replicated, although some of the quota metadata may be sent to the destination concurrently with the user data. The destination then dynamically creates and updates its own quota accounting of the volume being moved, based on the user data and quota metadata it receives during the logical replication. Here "dynamically" means that the operation occurs on-the-fly, i.e., as user data are being received during the logical replication. In some instances, updating the quota accounting on the destination involves making corrections to the quota accounting, since in some instances the quota metadata may be received at the destination out of order relative to its corresponding user data. For example, user data representing the contents of an inode that is part of a qtree may be received at the destination before certain attributes of the qtree to which the inode belongs are received at the destination. Nonetheless, the technique introduced here allows for such instances, such that at the end of the process, all of the quota metadata, including the quota rule, quota state and quota accounting, are current at the destination.

Figure 5A:
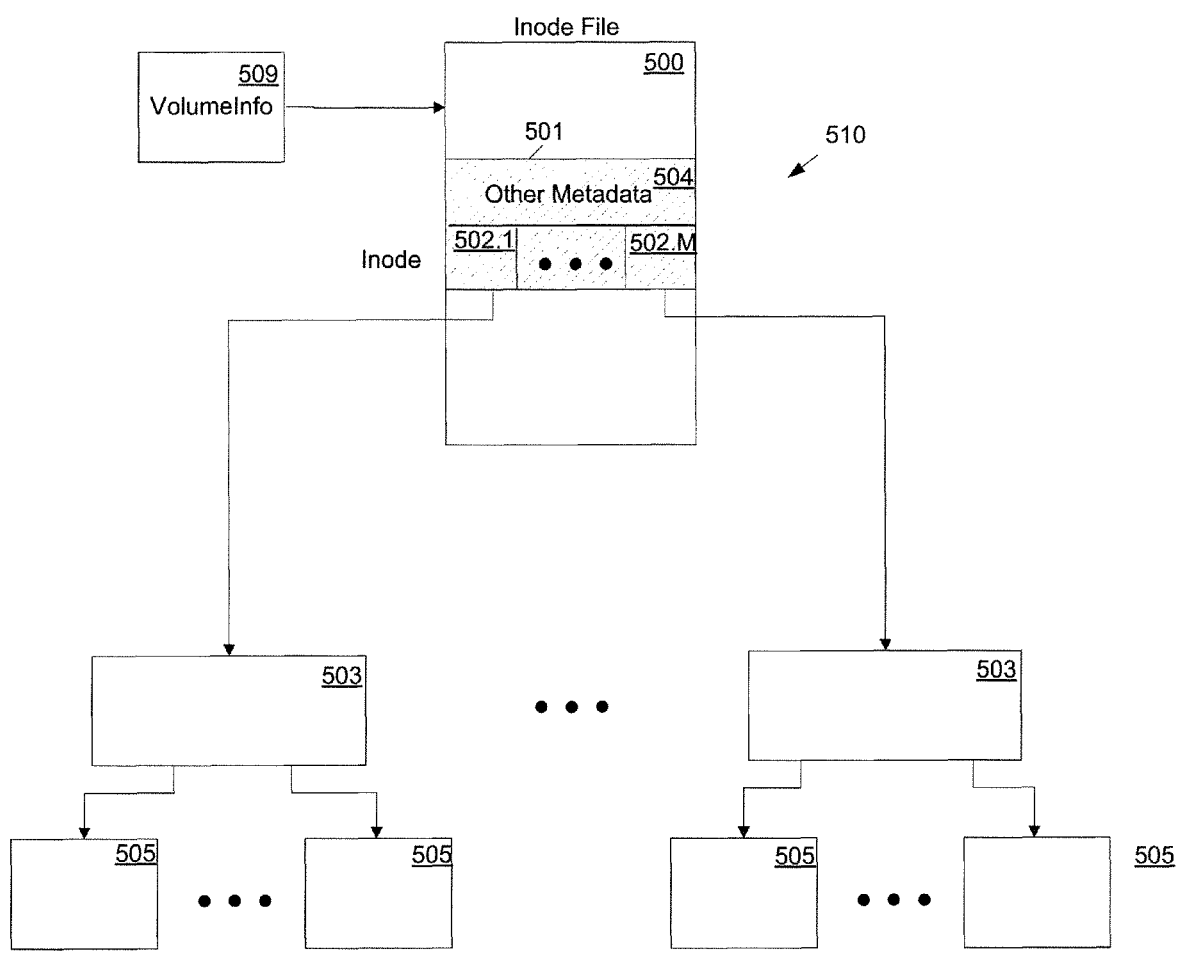
FIG. 5A shows a hierarchy of blocks representing a storage object, with an inode as its root.
Figure 5B:
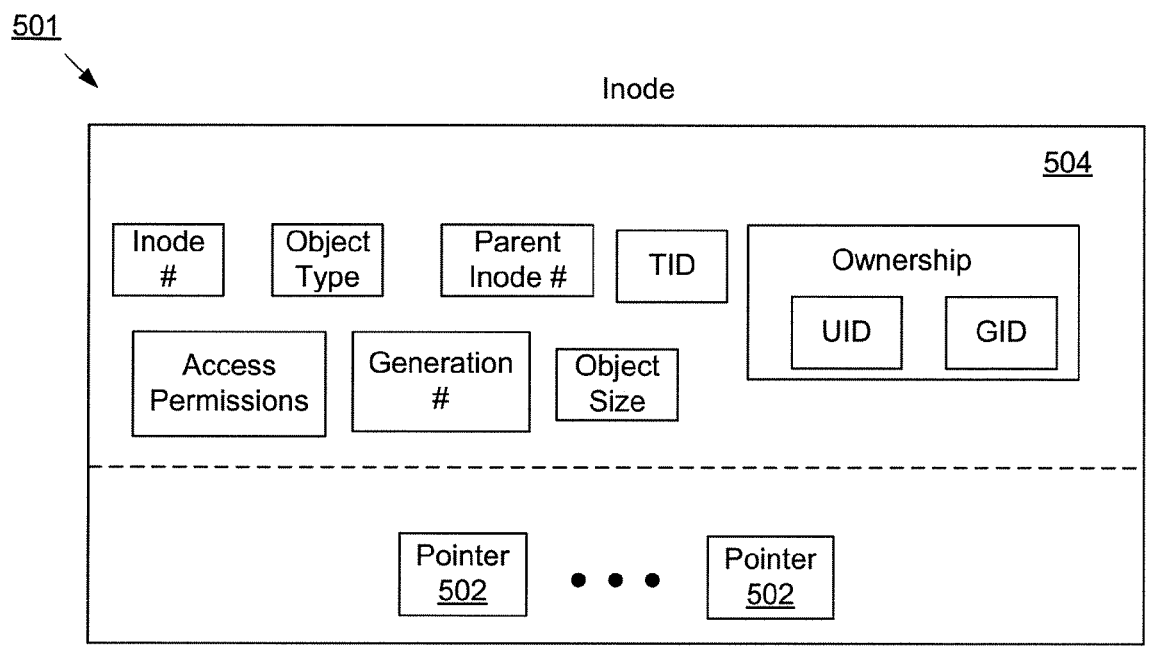
FIG. 5B shows an example of the contents of an inode.

The technique will now be further described with reference to FIGS. 5 through 11. As shown in FIG. 5A, in one embodiment every directory, qtree and file in a volume is represented by a separate inode 501. An inode 501 is a metadata container that resides in special type of block. An inode 501 contains metadata about the storage object it represents (e.g., file, qtree or directory) and is the root of a hierarchical structure 510 of blocks that make up the storage object (the lowest level of such structure is the actual user data of the object). As shown in FIG. 5B, metadata 504 included in an inode 501 can include, for example: the inode number of the object (a unique identifier of the inode); the type of storage object which the inode represents; a tree identifier (TID) which uniquely identifies the qtree with which the inode is associated, if any; a parent inode number identifying the inode of the parent entity of the inode; ownership of the storage object, including a user identifier (UID) and group identifier (GID); access permissions for the object; and size of the object. An inode 501 also includes a set of pointers 502 to lower-level blocks 503, in addition to the other metadata 504 noted above. A given storage object, such as a file, qtree or directory, is stored in the form of a hierarchical structure 510, which includes its inode 501, typically a number of indirect blocks 503, and a number of lowest level blocks (also called "direct blocks" or "level-0" blocks) 505 that contain the actual user data.

As shown in FIG. 5A, the inodes of the files, qtrees and directories in a volume are stored in a special system file, i.e., an inode file 500. A separate inode file 500 is maintained for each volume. Each inode 501 in an inode file 500 is the root of a hierarchical structure 510 of blocks. The location of the inode file 500 for each volume is stored in a Volume Information ("VolumeInfo") block 509 associated with that volume. The VolumeInfo block 509 is a metadata container that contains metadata that applies to the volume as a whole.

Figure 6A:
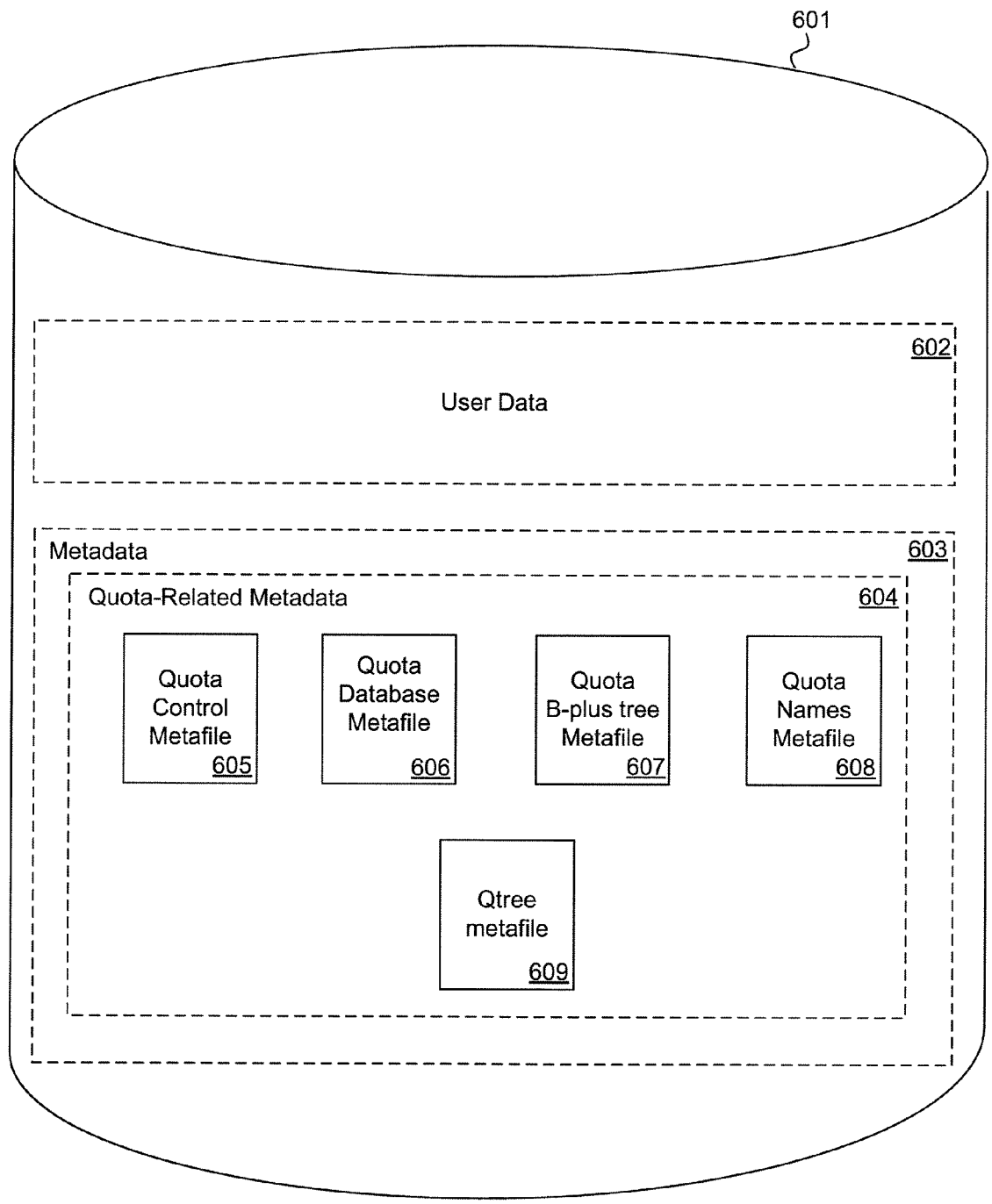
FIG. 6A schematically illustrates a volume including user data and metadata, including various types of qtree and quota metadata.

Any given volume includes both user data and metadata. FIG. 6A shows, for an illustrative volume 601 which includes at least one qtree (not shown), that the volume 601 includes various user data 602 and various metadata 603, where the metadata 603 includes quota-related metadata 604, and the quota-related metadata 604 includes various types of metadata relating to the qtree(s) and quota accounting. Specifically, the quota-related metadata 604 includes a quota control metafile 605, a quota database 606, a quota B-plus tree metafile 607, a quota names metafile 608, and a qtree metafile 609. All of the quota related metadata 604 will be recreated at the destination when the volume 601 is copied or moved from the source to the destination.

The quota control metafile 605 includes the quota status and a logging interval for the entire volume 601. The quota status specifies whether quotas are ON or OFF for the volume 601, and the logging interval specifies the minimum time interval by which an error message should be output to an administrative user when a quota limit is exceeded.

The quota database metafile 606 includes the quota rules and the quota accounting for each qtree (i.e., an accounting of the number of files and blocks associated with each qtree). Quota rules can specify limits for usage of storage devices (e.g., disks), which can include different types of limits corresponding to different levels of notification to an administrative user, such as "hard" limits, thresholds and "soft" limits. Quota rules can also specify limits for file usage (e.g., hard and soft limits).

In one embodiment there are two types of quota rules: default rules and explicit rules. The target of an explicit rule can be a particular qtree, user, group or set of users. In one embodiment only one quota rule can be created for a given target. An example of an explicit rule with a qtree as its target is:

qtree "q1" in volume "vol1" has a hard-disk-limit of 10 GB, threshold of 9.5 GB and soft-disk-limit of 8 GB, and has a hard-file-limit of 1 million and soft-file-limit of 0.9 million.

Note that the actual syntax used for a quota rule in the quota database metafile 606 is not germane to this description; essentially any convenient format can be used.

A default rule is a rule which applies to multiple targets. For example, an administrator can define a default tree rule that says, for any qtree created, the storage limit is 10 GB. Once a default rule is in place, any new qtree that gets created will inherit this rule, unless an explicit rule is defined that qtree. Such a rule, when inherited from the default rule, is called a "derived rule" and gets added to the quota database metafile 606 as a rule to be enforced for that target.

The quota B-plus tree metafile 607 allows for fast random access of records in the quota database metafile 606 and takes the TID attribute of a qtree root inode as its index key, outputting an identifier of a record in the quota database metafile 606. The quota names metafile 608 contains the ASCII string of the name an administrative user gives to the target of each quota rule in the quota database metafile 606 (where the target of a quota rule can be a qtree, user or group). The record for the associated quota rule has a pointer to the appropriate entry in the quota names metafile 608. The qtree metafile 609 includes metadata specifically about each qtree, including the TID and security style (e.g., Unix, NTFS or mixed type) of the qtree and whether opportunistic locks ("op locks") are enabled for the qtree. In addition, the qtree metafile also includes the inode number of the inode of the qtree (i.e., the qtree root inode), a generation number of the qtree root inode, and a name location cookie which stores the location of the directory entry that contains the name of the qtree root inode within the root directory of the volume 601. The generation number is used to determine whether the file handle that the client has represents the file that the server has (it does if the generation numbers match).

Figure 6B:
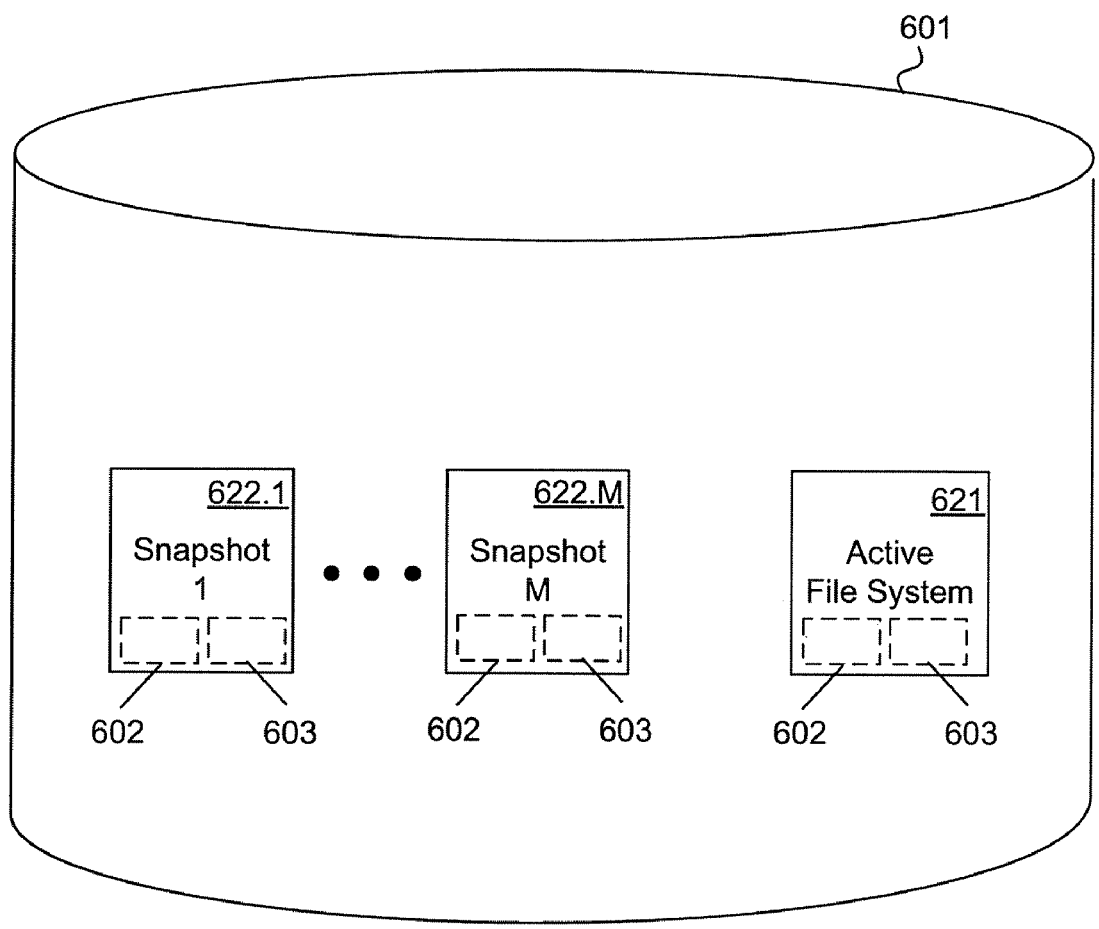
FIG. 6B schematically illustrates a volume including multiple snapshots and an active file system.

As shown in FIG. 6B, a given volume 601 typically includes an active file system 621 (which is the volume in its current state) and one or more snapshots of the volume 622.1-622.M. The active file system 621 includes all of the user data 602 and all of the metadata 603 of the volume 601. Each snapshot 622 also includes all of the user data 602 and all of the metadata 603 (including quota-related metadata 604) of the volume, for a particular past point in time, i.e., the point in time at which the snapshot was created.

Figure 6C:
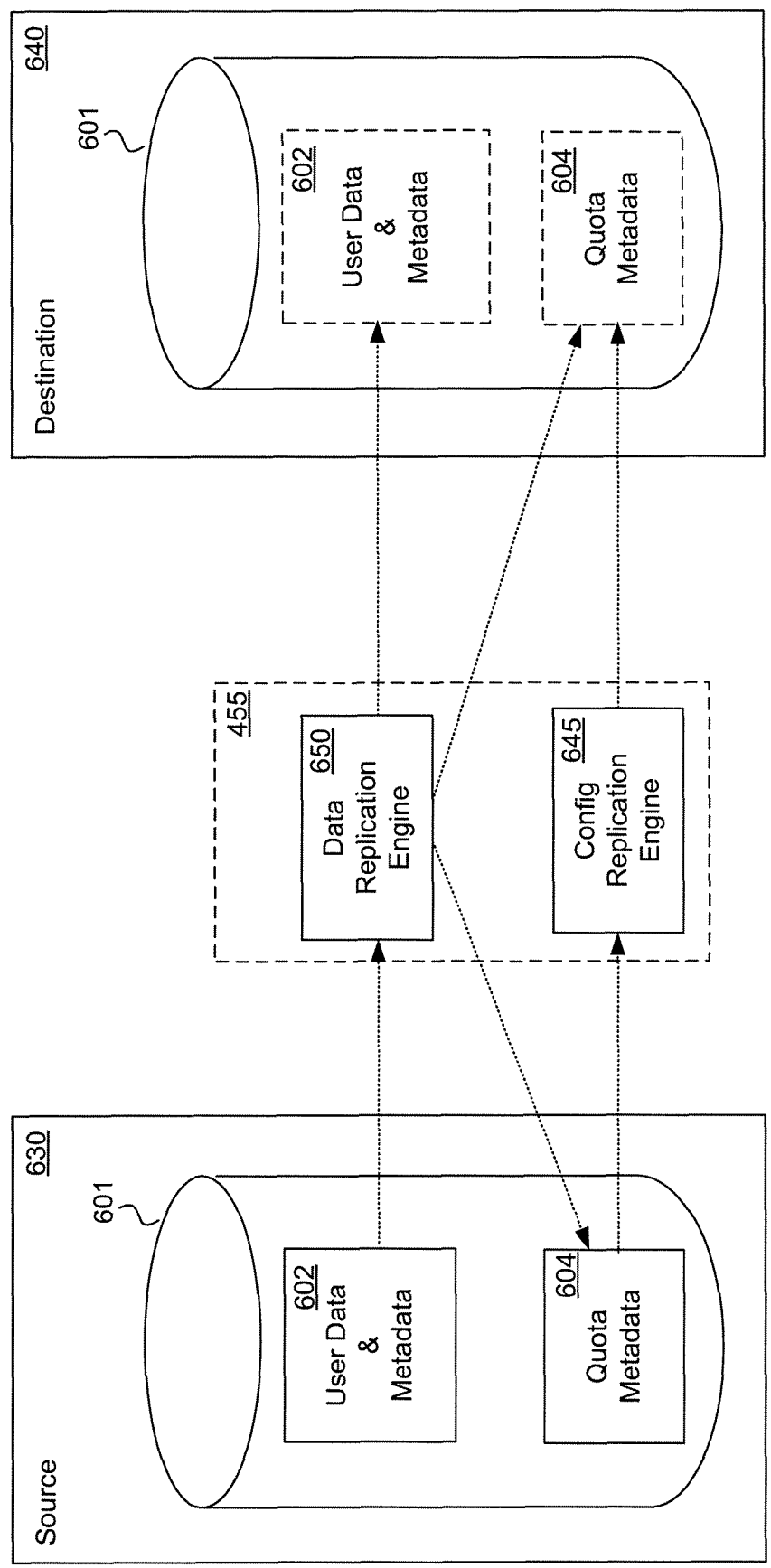
FIG. 6C illustrates the use of two different communication processes to copy or move a volume from a source to a destination.

As shown in FIG. 6C, the technique introduced here involves sending information from the source to the destination using at least two separate processes. In one embodiment the replication module 455 (FIG. 4) includes a data replication engine 650, which implements one of these processes, and a configuration replication engine 645 which implements the other process. User data and associated metadata 602 of snapshots (not shown) of the volume 601 at the source 630 are sent to the destination 640 through the data replication engine 455, which accomplishes that using logical replication. The data replication engine 650 also updates the quota metadata 604. If the source 630 and destination 640 are associated with different D-modules, then this may be done through two instances of the data replication engine 455, one at the source and one at the destination.

However, quota-related metadata 604 are sent to the destination 640 by using a separate communication process, executed by the configuration replication engine 645, which does not involve logical replication. If the source 630 and destination 640 are associated with different D-modules, then this may be done through two instances of the configuration replication engine 645, one at the source and one at the destination. The configuration replication engine 645 can use any convenient communication protocol and/or communication channel. Further, at least some of the quota-related metadata 604 are sent to the destination before the user data and associated metadata 602 are sent, to enable dynamic updating of the quota accounting at the destination.

In one embodiment, the data replication engine 650 uses four types of messages to communicate with the destination, namely, Push_Inode messages, Push_Blocks messages, Push_Holes messages and Push_Dirent messages.

A Push_Inode message is used only to send an inode. This type of message includes the inode number, generation, object type, TID, UID, GID, etc. of the inode being sent. It is used to update the quota accounting and qtree metafile at the destination.

A Push_Blocks message is used to send one or more user data blocks or an associated (non-inode) metadata blocks. This type of message includes the inode number, generation, type of inode and offset of the blocks being transmitted, as well as the actual block(s). It is used to update the quota accounting at the destination.

A Push_Holes message is used to indicate that a particular offset that was used to hold a block no longer holds a block, i.e., it is a "hole". This type of message includes the inode number, generation, type of inode and offset of the hole(s). It is used to update the quota accounting at the destination.

A Push_Dirent (push directory entry) message is used to give the directory entry (e.g., a file) for a particular directory inode. This type of message contains the directory's inode number and generation number and the directory entry's name, inode number and generation number. It is used to update the qtree metafile at the destination.

The message type of a given message can be identified in any convenient manner, such as by a header in the message. The specific format of these messages is not important; any convenient format can be used. If the source 630 and destination 640 are associated with different D-modules 216, then communication of these messages can be carried out via the CF interface modules 440b (FIG. 4) of those D-modules 216.

In one embodiment, the configuration replication engine 645 uses four types of messages to communicate quota metadata with the destination, namely, Qtree_Attrs messages, Quota_Status messages, Quota_Rules messages and Quota_Names messages. A Qtree_Attrs message communicates information about a qtree's security style and oplocks. A Quota_Status message communicates whether quotas are ON or OFF and the logging interval for the volume. A Quota_Rules message communicates the quota rules configured for any qtree within a volume. A Quota_Names message communicates to the destination that the destination can generate the qtree names to be populated in the quota names metafile 608 at the destination, as described further below.

Figure 6D:
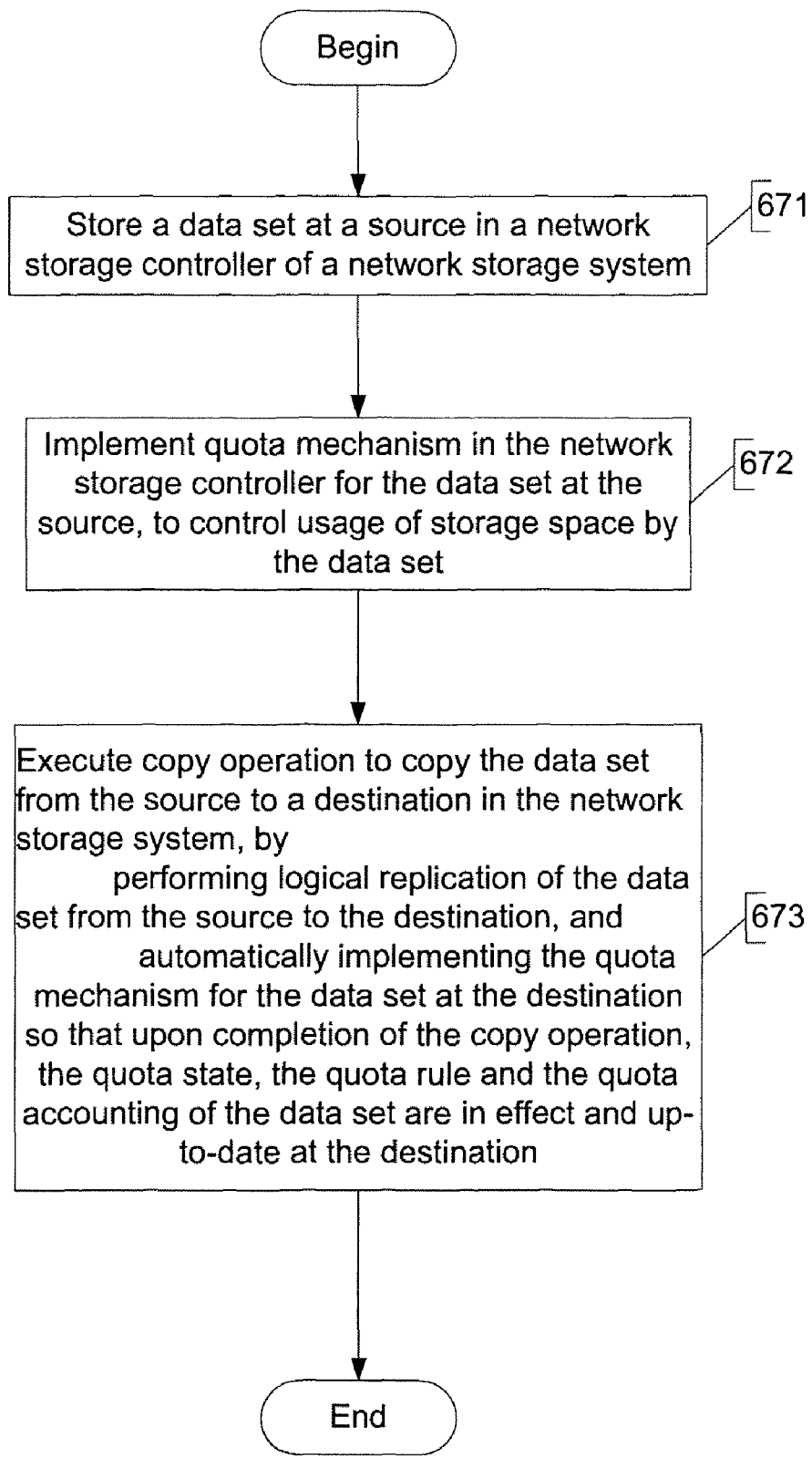
FIG. 6D is a flowchart summarizing the technique introduced here, according to one embodiment.

The technique introduced here, according to one embodiment, can be summarized as follows and as illustrated in FIG. 6D: The technique begins at 671 with storing a data set at a source in a network storage controller of a network storage system. The technique implements a quota mechanism in the network storage controller for the data set at the source at 672, to control usage of storage space by the data set. The quota mechanism includes a quota state, a quota rule and a quota accounting of the data set at the source. The technique then at 673 executes a copy operation to copy the data set from the source to a destination in the network storage system. The copy operation includes performing a logical replication of the data set from the source to the destination, and automatically implementing the quota mechanism for the data set at the destination so that upon completion of the copy operation, the quota state, the quota rule and the quota accounting of the data set are in effect and up-to-date at the destination.

Figure 7:
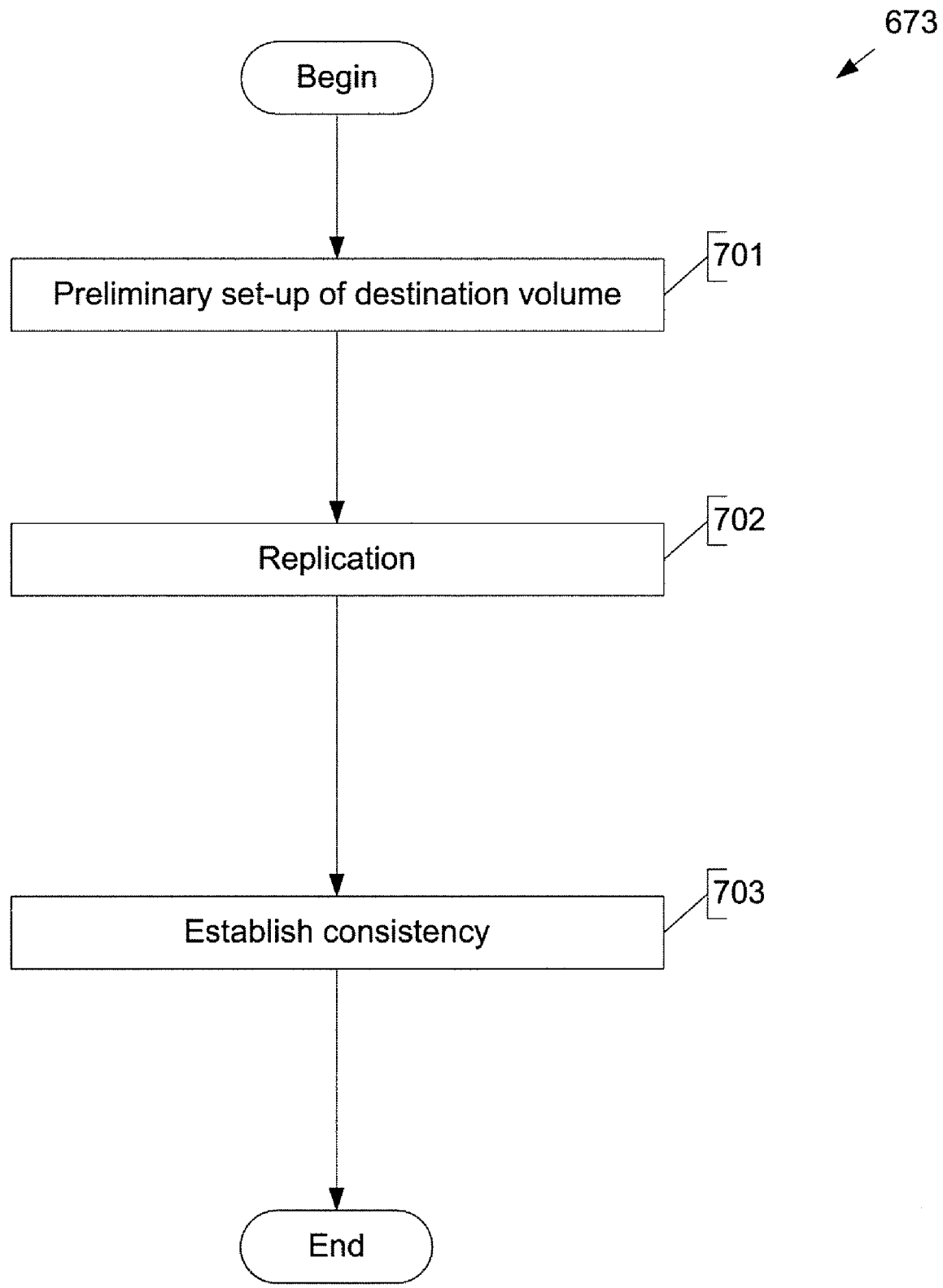
FIG. 7 shows the overall process of copying or moving a volume, according to an embodiment of the technique introduced here.

An embodiment of the process 673 of copying or moving a volume is further discussed now with reference to FIGS. 7 through 11. It is assumed that the volume to be copied/moved includes at least one qtree with quotas enforced on the volume. It is further assumed that the volume includes at least one pre-existing snapshot, where "pre-existing" means that the snapshot already exists at the time the copy/move operation is initiated. As shown in FIG. 7, the overall process can be considered to have three stages: a preliminary stage 701 which sets up the destination volume, followed by a replication stage 702, and then a final stage 703 of establishing consistency between the volume at the source and the volume at the destination (in the case of a move, the source volume is effectively deleted at the end of the process).

Figure 8:
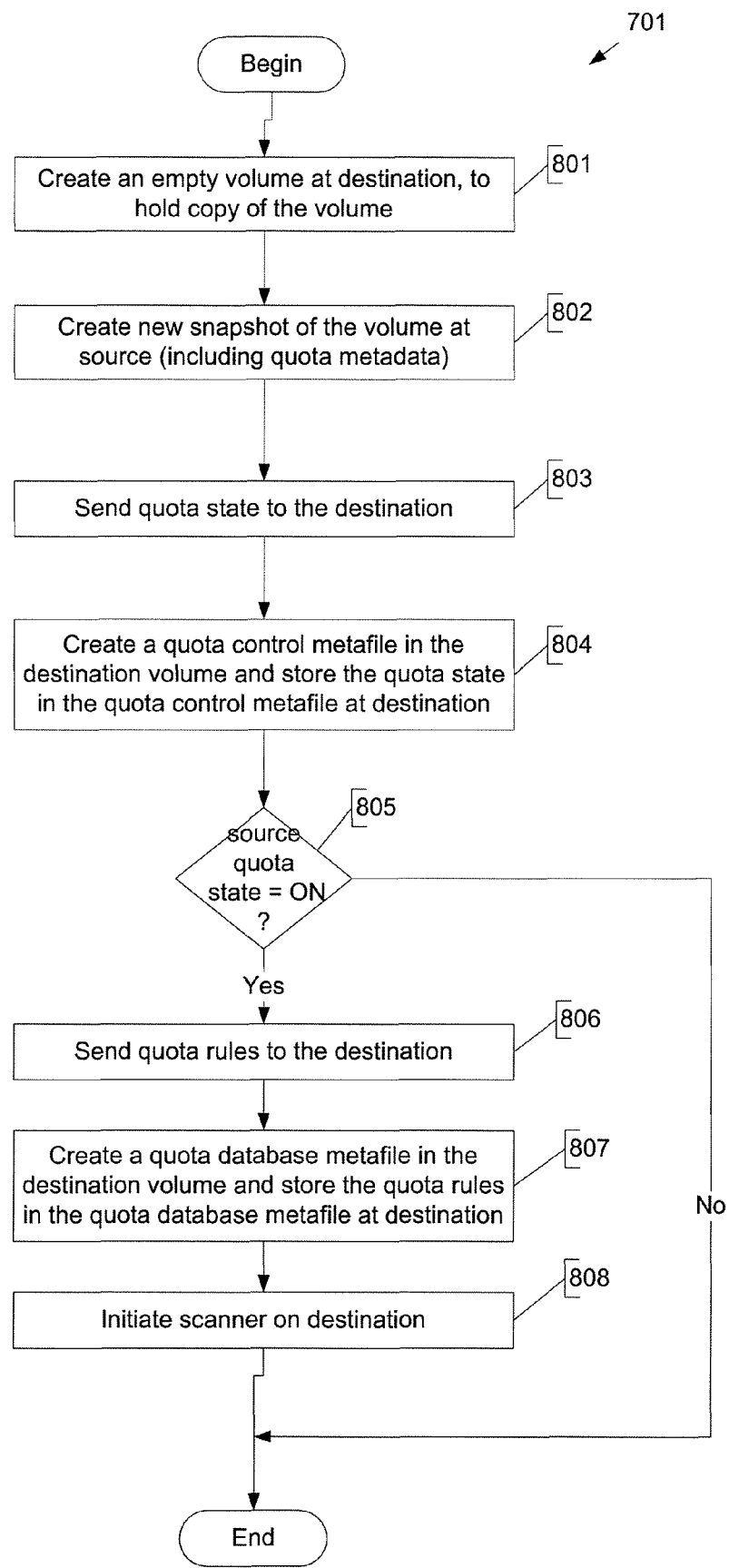
FIG. 8 shows the details of the preliminary setup stage of copying or moving a volume, according to an embodiment of the technique introduced here.

FIG. 8 illustrates the details of the preliminary setup stage 701, according to one embodiment. Initially, at 801 the process creates an empty volume at the destination to hold a copy of the volume being moved or copied. Next, at 802 the process creates a new snapshot of the volume at the source (i.e., new with respect to any snapshots that already exist at the time the copy/move process is initiated), and this new snapshot can be referred to as a baseline quota metadata snapshot. In one embodiment, each snapshot of a volume, except the earliest-in time snapshot, shares with the next earlier snapshot any blocks that have not changed between the two snapshots. This avoids unnecessary duplication of data from one snapshot to another.

The snapshot created at 802 includes the quota metadata for the volume, including its quota state and any associated quota rules. Therefore, at 803 the process sends the quota state (ON or OFF) for the volume, from the snapshot generated at 802, to the destination. The process then creates a quota control metafile 605 in the destination volume and stores the quota state in that metafile at 804.

Next, if the source quota state is ON for the volume at 805, the process proceeds to 806-808; otherwise, the first stage 701 ends at this point. At 806 the process sends the quota rule for each qtree at the source, from the snapshot generated at 802, to the destination. At 807 the process creates a quota database metafile 606 in the destination volume and stores the quota rules that were sent at 806 in that metafile. Also at 807 the process creates and populates a quota B-plus tree metafile 607 for the received quota rules at the destination. At 808 the process initiates operation of a quota scanner 478 on the volume at the destination. After 808 the process ends.

Communication of this metadata between the source and the destination can be done using any convenient communication protocol or channel; however, in one embodiment these steps are done using a communication process that is separate from the logical replication process. In one embodiment, the quota state and quota rules are communicated from one D-module 216 associated with the source to another D-module 216 associated with the destination.

Figure 9:
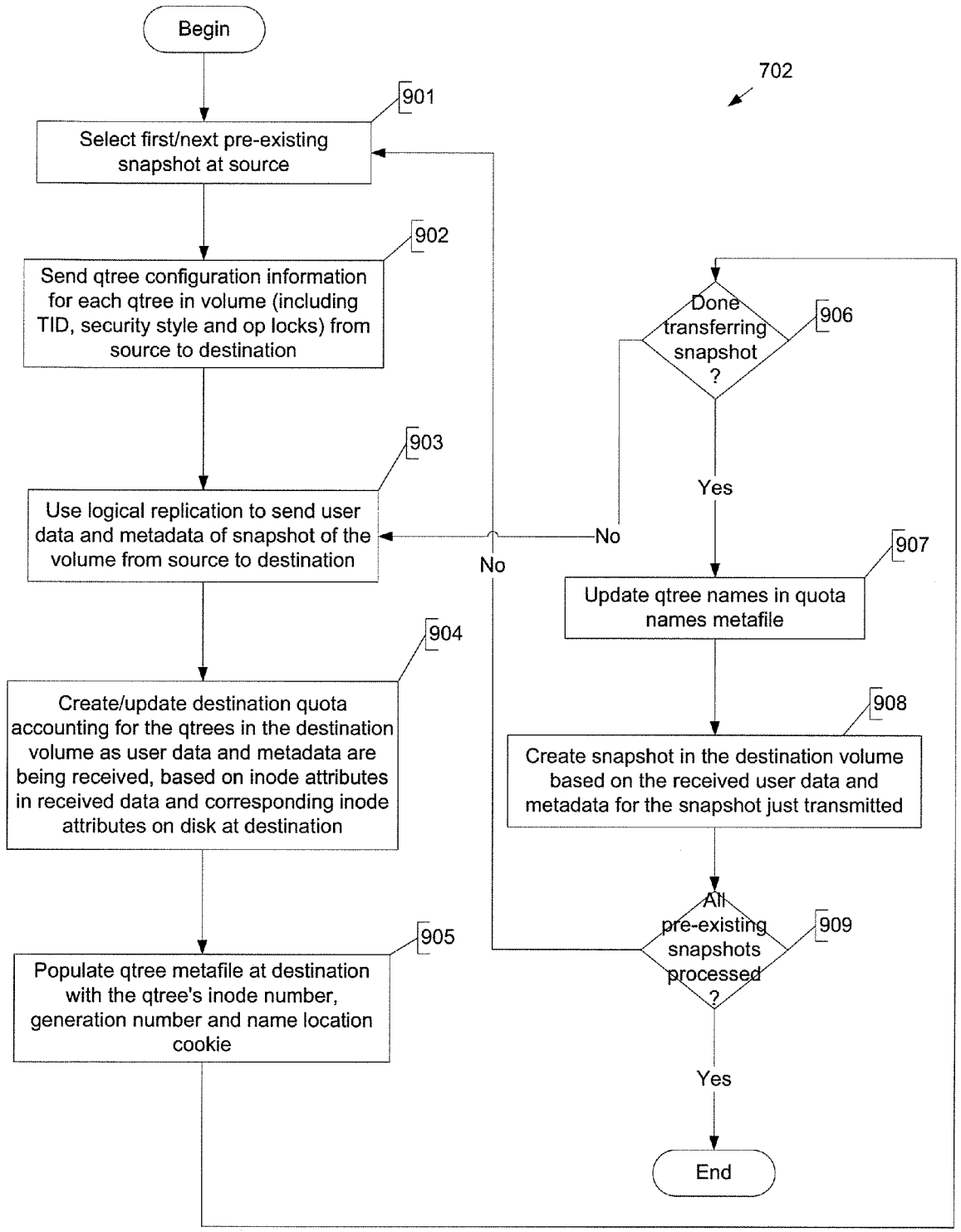
FIG. 9 shows the details of the replication stage of copying or moving a volume, according to an embodiment of the technique introduced here.

FIG. 9 illustrates the details of the replication stage 702, according to one embodiment. Note that in certain embodiments, no changes are allowed to quota state on the source volume during this stage. The actions described below in replication stage 702 are performed by the D-module(s) 216 associated with the source and the destination of the copy/move operation. If two different D-modules 216 are involved, then such communication can be carried out via the CF interface modules 440*b* (FIG. 4) of the affected D-modules 216.

The following actions are performed for each pre-existing snapshot of the volume at the source. Initially, at 901 the process selects the first/earliest (or next) pre-existing snapshot of the volume at the source. At 902 the process sends qtree configuration information for each qtree in the volume from the source to the destination. The qtree configuration information sent in this step includes the TID, security style and op locks of each qtree. At 903 the process uses logical replication to send user data and certain metadata of the snapshot from the source to the destination. The metadata sent during 903 includes the inodes of the volume's qtrees, directories and files, including inode attributes such as inode numbers, generation numbers, etc.

At 904 the process creates or updates the destination quota accounting in the quota database metafile of the destination volume. The quota accounting is maintained on a per-qtree basis. This operation is performed dynamically in response to the receipt of snapshot user data and metadata in 903, as such user data and metadata are received at the destination. Creating or updating the quota accounting is done based on the inode attributes received (e.g., TIDs) and corresponding inode attributes already stored on disk at the destination, as described further below in relation to FIG. 10.

At 905, the process populates the qtree metafile in the volume at the destination with each qtree root's inode number, generation number and name location cookie, whenever these metadata are received at the destination. Hence, this operation is also performed dynamically in response to the receipt of user data and metadata in 903.

After all of the snapshot user data and metadata for a given snapshot have been transferred and processed in this manner (906), then at 907 the process updates qtree names in the quota names metafile 608 at the destination. This is done by the configuration replication engine 645 sending a Quota_Names message, from the source to the destination.

To understand operation 907 better, note that a derived rule for a qtree gets created on the destination when a new TID is first detected at the destination from a Push_Inode replication message (assuming there is a default rule for qtrees in place). When such a derived rule gets added to the quota database metafile 606, the particular record in the quota database metafile 606 has to point to a location within the quota names metafile 608 that contains the path of the affected qtree. However, this location information within the derived record is not populated during the derived rule creation on the destination as part of volume copy/move, since the path of the qtree to which the new TID refers is not yet available. To populate this location information within the derived record, a Quota_Names message is sent from the source to the destination after the logical replication is finished for a given snapshot. At the destination, as part of this message, the process "walks" through the quota database metafile 606 at the destination, finds the derived rules and checks whether the location information is populated and the location points to the right path of the qtree. If the location information is not populated or the path of the qtree is different, it is corrected at the destination at this time.

Referring back to FIG. 9, at 908 the process creates a corresponding snapshot in the destination volume based on the transferred user data and metadata. After all the pre-existing snapshots have been processed in this manner (909, 901), the replication stage 702 of the process ends.

Figure 10B:
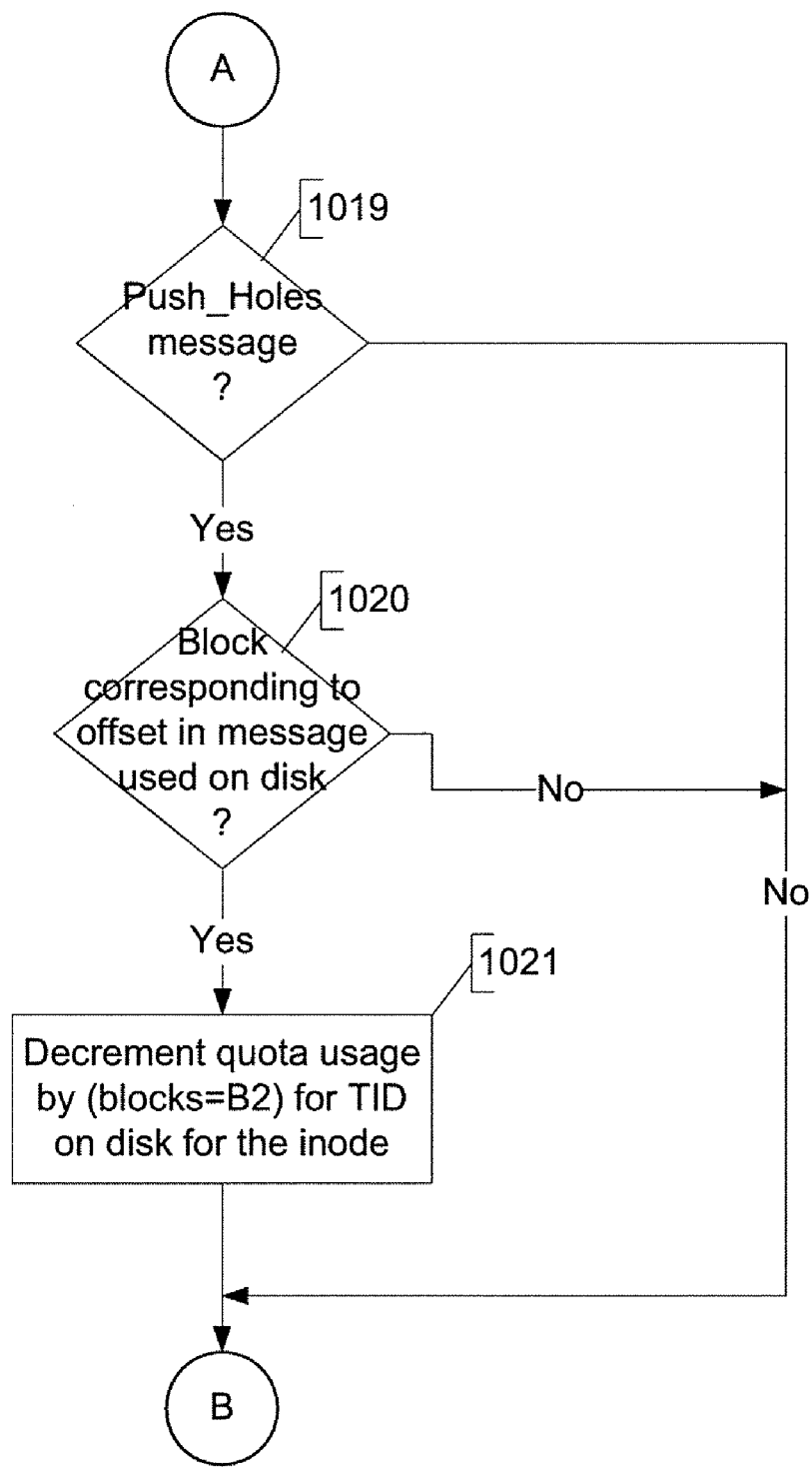

FIGS. 10A and 10B collectively illustrate the details of a process for creating/updating the destination quota accounting (904) in response to a message from the source, according to one embodiment. As can be seen, the operations which occur at the destination depend on the type of message received at the destination (e.g., Push_Inode, Push_Blocks, Push_Hole).

Initially, at 1001 the destination receives a message from the source. If the message is a Push_Inode message (1002), the process proceeds to 1007. At 1007, the process compares the generation number and object type in the Push_Inode message with the generation number and type for the inode on disk which has the inode number specified in the received message. If both values match (1008), then at 1009 the process decrements the quota usage appropriately for the old TID (i.e., the TID that is present in the inode on disk). Specifically, the process decrements the blocks count by the number, B1, of blocks currently consumed by this inode on disk, and decrements the file count by one. Additionally, if the generation number and type match, the process increments the blocks count by B1 and the file count by one for the new TID (i.e., the TID that has arrived with the Push_Inode message). The process then ends.

If the generation number or type in the Push_Inode message do not match those on disk for the corresponding inode number, then from 1008 the process branches to 1011, where it determines whether the type indicated in the inode on disk is a valid type. For example, an inode which is either unused or represents an access control list (ACL) is considered to be invalid for purposes of quota accounting. Other types of modes (e.g., regular, directory, stream, special files) are considered to be valid. If the type is valid, then at 1012 the process decrements the blocks count by B1 and decrements the file count by one for the old TID. Next, at 1013 the process reinitializes the specified inode at the destination with the new generation number and type values, and then increments the file count for the new TID by one at 1014. The process then ends. If the type is not valid at 1011, the process skips from 1011 to 1013, described above.

If the received message is a Push_Blocks message (1003), then from 1002 the process proceeds to 1004. At 1004, the process compares the generation number and object type in the Push_Blocks message with the generation number and type for the inode on disk which has the inode number specified in the received message. If both values match (1005), then at 1006 the process increments the blocks count by B1 for the TID on disk. The process then ends.

If the generation number or type in the Push_Blocks message do not match those on disk for the corresponding inode number, then from 1005 the process branches to 1015, where it determines whether the type indicated in the inode on disk is a valid type, based on the criteria mentioned above (regarding 1011). If the type is valid, then at 1016 the process decrements the blocks count by B1 and decrements the file count by one for the old TID. Next, at 1017 the process reinitializes the specified inode at the destination with the new generation number and type values, and then at 1018 increments the file count by one and increments the blocks count by the number, B2, of blocks contained in the Push_Blocks message. The process then ends. If the type is not valid at 1015, the process skips from 1015 to 1017, described above.

If the received message is a Push_Holes message (1003), then from 1002 the process proceeds to 1020; otherwise, the process ends. At 1020 the process determines whether the block on disk corresponding to the offset indicated in the Push_Holes message is used. If the outcome of 1020 is affirmative, the process decrements the blocks count for the TID on disk for the inode, by B2 blocks; otherwise, the process ends.

Figure 10C:
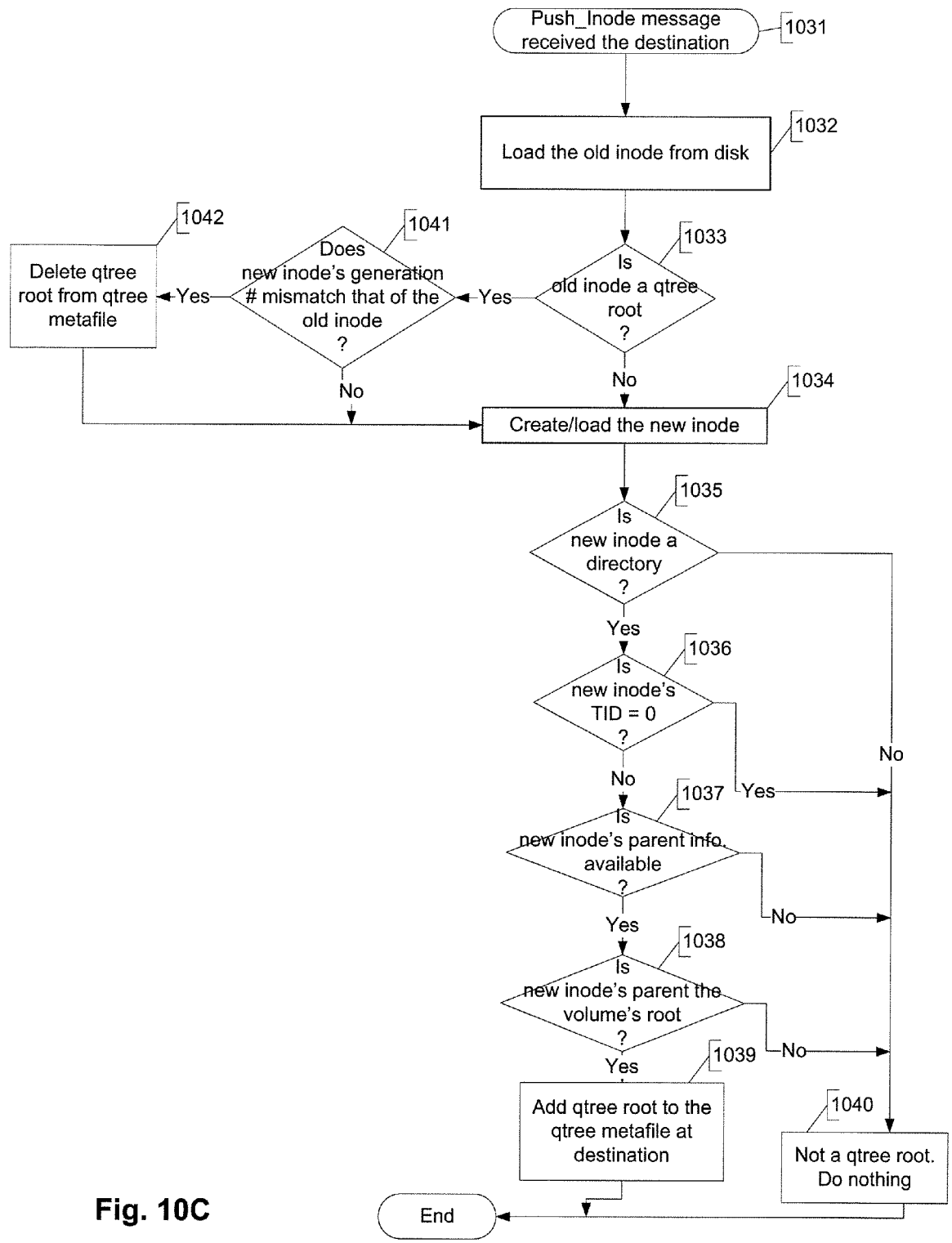
FIG. 10C illustrates the process at the destination of updating the qtree metafile in response to receiving a Push_Inode message at the destination.

Receiving a Push_Inode message or a Push_Dirent message at the destination during logical replication also triggers an update of the qtree metafile 609 at the destination. FIG. 10C illustrates the process at the destination of updating the qtree metafile 609 in response to receiving a Push_Inode message at the destination. Initially, a Push_Inode message is received at the destination at 1031. In response, at 1032 the process loads the "old" inode specified in message from disk at the destination. Next, the process determines at 1033 whether the old inode is a qtree root. If the old inode is not a qtree root, then the process continues to 1034, where a new inode that matches the inode contents in the Push_Inode message is created or loaded. Next, at 1035 the process makes one or more determinations, 1035-1038. Specifically, if the new inode is a directory (1035), and its parent information is available in the inode (1037), its parent is the volume's root (1038), and the its TID is not equal to zero (1036), then at 1039 the process adds the qtree root to the qtree metafile at the destination. If any of the above-mentioned conditions is not true, then that means the inode is not a qtree root, in which case the process does nothing further (1040). The process then ends.

If the old inode is determined to be a qtree root at 1033, then from 1033 the process branches to 1041, where it determines whether the new mode's generation number matches that of the old inode. If there is a mismatch, then the process deletes the qtree root from the qtree metafile 609 at the destination at 1042, after which the process continues to 1034, described above. If there is no mismatch at 1041, then the process continues immediately to 1034.

Figure 10D:
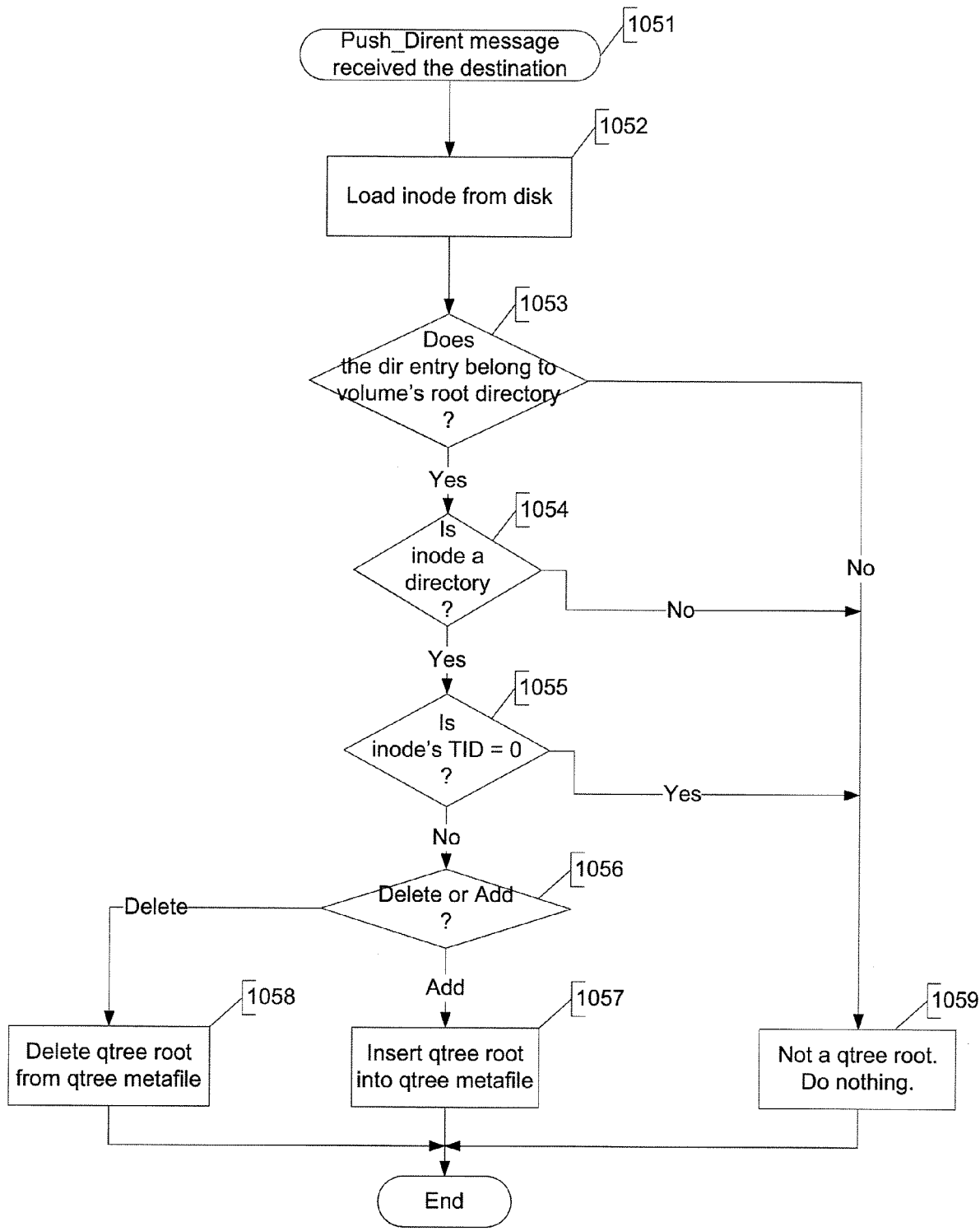
FIG. 10D illustrates the process at the destination of updating the qtree metafile in response to receiving a Push_Dirent message at the destination.

FIG. 10D illustrates the process at the destination of updating the qtree metafile 609 in response to receiving a Push_Dirent message at the destination. A Push_Dirent message is used to communicate a directory entry (e.g., a file) for a particular directory inode. Initially, a Push_Dirent message is received at the destination at 1051. In response, at 1052 the process loads the inode specified in the message from disk at the destination. Next, if the directory entry specified in the message belongs to the volume's root directory (1053), the inode itself represents a directory (1054) and its TID is not equal to 0 (1055), then this means the directory entry is a qtree root. In that case, the process either inserts the qtree root into (1057) the qtree metafile 609 or deletes the qtree root from (1058) the qtree metafile 609, at the destination, depending on whether the received message specified to add or delete the entry. If any of the above-mentioned checks 1053-1055 fails, then this means the directory entry is not a qtree root, in which case the process does nothing further (1059). The process then ends.

Figure 11:
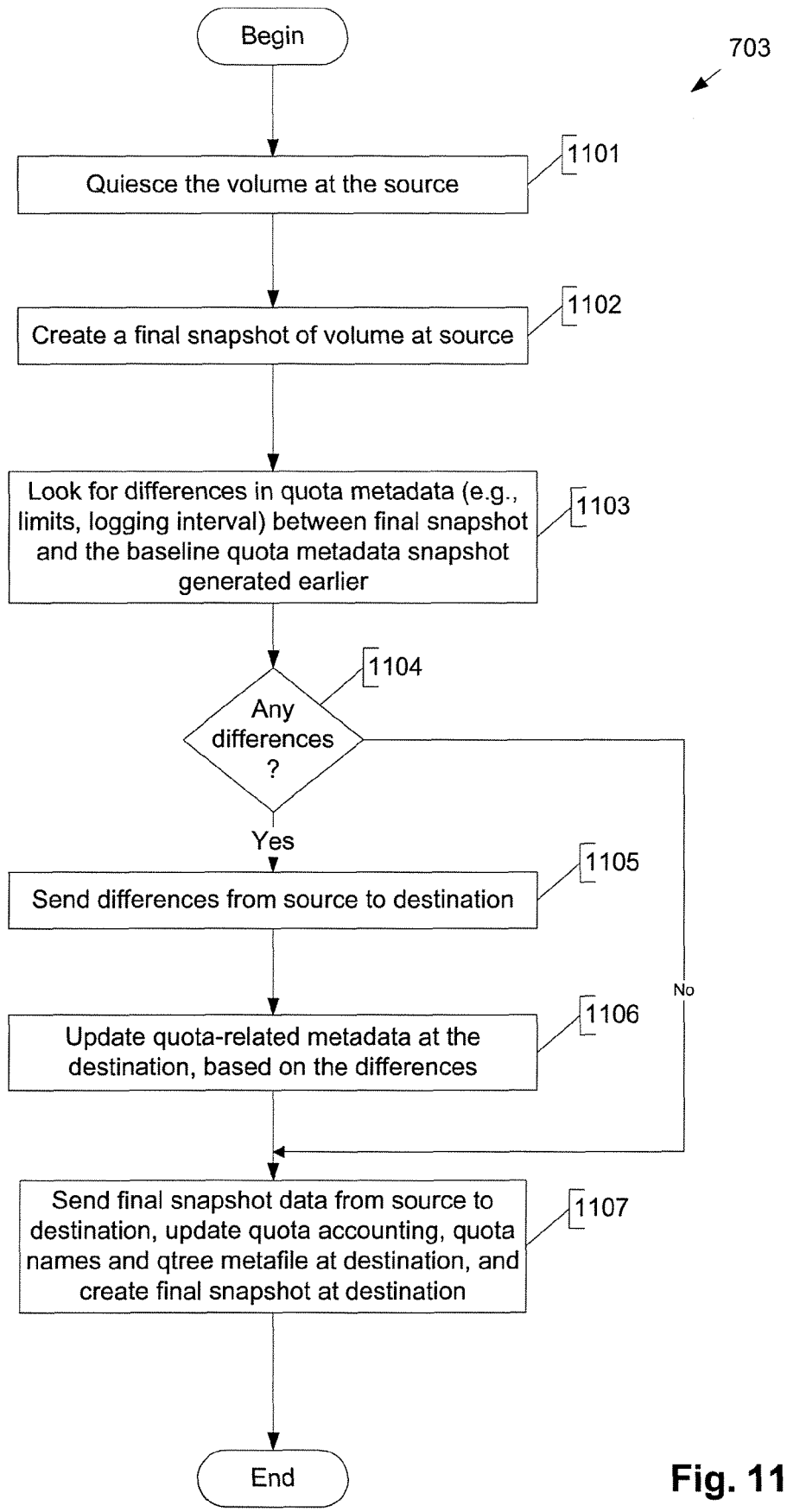
FIG. 11 shows the details of the final stage of copying or moving a volume, according to an embodiment of the technique introduced here.

FIG. 11 illustrates the details of the final stage 703 of the copy/move operation, according to one embodiment. After completion of the replication stage 702, in the final stage 703 the process initially quiesces the volume at the source. Quiescing the volume in this context means that no further writes are allowed to the volume at the source. However, to maintain substantial transparency to the users/clients, any writes submitted by a client while the volume is quiesced at the source are buffered in the receiving N-module until the volume goes online at the destination; all clients are unaware of this quiescing and buffering.

Next, at 1102 the process creates a final snapshot of the volume at the source. The process then determines at 1103 whether there any differences in certain quota metadata between this final snapshot and the snapshot that was generated at 802 (FIG. 8), i.e., the baseline quota metadata snapshot. The quota metadata that is compared in this step includes, for example, the quota limits and logging intervals for the volume. The manner in which such differences are detected is not germane to this description; any convenient method of detecting differences in data can be used.

If no differences are detected (1104), then the process proceeds to 1107, as described below. If any differences are detected, then at 1105 the process sends the differences from the source to the destination. Note that these differences can be sent using any convenient communication protocol or channel, however, in one embodiment they are sent using a protocol and process separate from the logical replication process. Next, the destination updates the appropriate quota-related metadata 604 at the destination, based on these differences. Finally, at 1107 the process sends the user data and metadata of the final snapshot to the destination (through logical replication), appropriately updates the destination quota accounting, quota names metafile and qtree metafile at the destination, and creates a corresponding final snapshot of the volume at the destination, all in essentially the same way as described above (FIGS. 9 and 10).

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   storing a data set at a source by using a network storage controller of a network storage system;
   implementing a quota mechanism in the network storage controller for the data set at the source, to control usage of storage space by the data set, the quota mechanism including a quota state, a quota rule and a quota accounting of the data set at the source; and
   executing a copy operation to copy the data set from the source to a destination in the network storage system, including
      performing logical replication of the data set from the source to the destination, and
      automatically implementing the quota mechanism for the data set at the destination so that upon completion of the copy operation, the quota rule is in effect and the quota state and the quota accounting are up-to-date for the data set at the destination.

2. A method as recited in claim 1, wherein automatically implementing the quota mechanism for the data set at the destination comprises implementing the quota mechanism for the data set at the destination without requiring a user to initialize the quota mechanism for the destination.

3. A method as recited in claim 2, wherein the data set is a volume and the copy operation is part of a volume move operation, and wherein the storage client does not have to unmount the volume at the source and remount the volume at the destination to gain access to the volume at the destination.

4. A method as recited in claim 1, wherein said logical replication of the data set comprises sending user data of the data set from the source to the destination, and wherein said automatically implementing the quota mechanism for the data set at the destination comprises sending quota metadata of the data set from the source to the destination in a separate process from sending the user data from the source to the destination.

5. A method as recited in claim 1, wherein automatically implementing the quota mechanism for the data set at the destination comprises:
   dynamically updating a quota accounting of the data set at the destination in response to receiving data of the data set at the destination during the logical replication.

6. A method as recited in claim 1, wherein automatically implementing the quota mechanism for the data set at the destination comprises:
   generating the quota accounting of the data set at the destination.

7. A method as recited in claim 1, wherein the quota mechanism includes a quota rule and quota structure metadata, and wherein automatically implementing the quota mechanism for the data set at the destination comprises:
   sending the quota rule and the quota structure metadata from the source to the destination separately from user data of the data set.

8. A method as recited in claim 1, wherein said method comprises:
   receiving at the destination a plurality of blocks of the data set as part of said logical replication;
   in response to receiving the plurality of blocks at the destination, updating the quota accounting of the data set at the destination;
   after performing said updating, receiving at the destination, a quota structure metadata attribute as part of said logical replication; and
   in response to receiving the quota structure metadata attribute at the destination, correcting the quota accounting of the data set at the destination, based on the quota structure metadata attribute.

9. A method as recited in claim 8, wherein:
   said updating comprises crediting a number of blocks to a first quota structure associated with the data set, based on the first plurality of blocks; and
   said correcting comprises debiting the number of blocks from the first quota structure and crediting the number of blocks to a second quota structure associated with the quota structure metadata attribute.

10. A method as recited in claim 9, wherein:
   wherein implementing the quota mechanism at the source comprises maintaining a quota structure metafile that contains metadata about a quota structure at the source; and
   wherein the copy operation comprises reconstructing the quota structure metafile at the destination by
      sending one or more messages of a first type, a second type or both from the source to the destination, the first type of message for pushing inode metadata from the source to the destination, the second type of message for pushing directory entry metadata from the source to the destination; and
      reconstructing the metafile at the destination based on the one or more messages.

11. A method as recited in claim 1, wherein the data set is stored in a source file system at the source and in a destination file system at the destination, and wherein the destination file system has a different format from that of the source file system.

12. A method as recited in claim 1, wherein the data set includes a set of one or more snapshots at the source, and wherein executing the copy operation comprises:
creating a baseline quota metadata snapshot of the data set at the source, the baseline quota metadata snapshot including quota metadata, the quota metadata including the quota rule and the quota state of the data set;
sending the quota state and the quota rule to the destination;
storing the quota state and the quota rule in the destination volume;
using logical replication to send user data in each snapshot of said set of one or more snapshots, from the source to the destination and to create a corresponding set of one or more snapshots of the data set in the destination volume based on the user data in each said snapshot sent from the source to the destination during the logical replication; and
applying the quota rule to each of the snapshots of the data set created at the destination.

13. A method as recited in claim 12, further comprising:
creating and updating the quota accounting of the data set in the destination volume, based on the user data in each said snapshot sent from the source to the destination during the logical replication;
quiescing the data set after all snapshots of said set of one or more snapshots have been sent to the destination;
generating a final snapshot of the data set at the source after the data set has been quiesced;
sending user data of the final snapshot from the source to the destination;
updating the destination volume with the user data of the final snapshot; and
updating the quota accounting of the data set in the destination volume, based on the received user data of the final snapshot.

14. A method as recited in claim 13, further comprising:
identifying a difference between quota metadata in the final snapshot and quota metadata in said baseline quota metadata snapshot;
sending data representing the difference from the source to the destination; and
updating the quota metadata at the destination, based on the data representing the difference.

15. A method as recited in claim 1, further comprising:
preventing modification of the quota state during said logical replication.

16. A method as recited in claim 1, wherein the first quota accounting comprises an accounting of a number of blocks used.

17. A method as recited in claim 16, wherein the first quota accounting comprises an accounting of a number of files used.

18. A method as recited in claim 1, wherein said method is implemented by at least one storage server node of a plurality of storage server nodes in a storage cluster, each of the storage server nodes separately including
an N-module that provides a network interface through which to communicate with a storage client over a network, and
a D-module, coupled to communicate with each N-module of the plurality of storage server nodes, which provides access to a nonvolatile mass storage subsystem, wherein the copy operation is executed by at least one said D-module.

19. A method comprising:
storing a volume at a source in a network storage controller in a network storage system, the volume including a set of one or more snapshots at the source;
implementing a quota mechanism for the volume at the source to control usage of storage space by the volume, the quota mechanism including a quota state, a quota rule and a quota accounting of the volume at the source; and
executing a copy operation to copy the volume from the source to a destination in the network storage system, including
creating a destination volume for the volume at the destination, to contain a copy of the volume;
creating a baseline quota metadata snapshot of the volume at the source, the baseline quota metadata snapshot including quota metadata, the quota metadata including the quota rule and the quota state;
sending the quota state and the quota rule to the destination;
storing the quota state and the quota rule in a metafile in the destination volume;
using logical replication to send user data in each snapshot of the set of one or more snapshots, from the source to the destination and to create a snapshot of the volume in the destination volume based on the user data of each said snapshot;
creating and updating the destination quota accounting of the volume in the destination volume, based on the user data in each said snapshot received at the destination during the logical replication;
quiescing the volume after all of said snapshots of the set of one or more snapshots have been sent to the destination;
generating a final snapshot of the volume at the source after the volume has been quiesced;
sending user data of the final snapshot from the source to the destination;
updating the destination volume with the user data of the final snapshot; and
updating the destination quota accounting of the volume in the metafile in the destination volume, based on the received user data of the final snapshot.

20. A method as recited in claim 19, wherein the copy operation further comprises:
identifying a difference between quota metadata in the final snapshot and quota metadata in the baseline quota metadata snapshot;
sending data representing the difference from the source to the destination; and
updating quota metadata at the destination, based on the data representing the difference.

21. A method as recited in claim 19, wherein said method is implemented by at least one storage server node of a plurality of storage server nodes in a storage cluster, each of the storage server nodes separately including
an N-module that provides a network interface through which to communicate with a storage client over a network, and
a D-module, coupled to communicate with each N-module of the plurality of storage server nodes, which provides access to a nonvolatile mass storage subsystem, wherein the copy operation is executed by at least one said D-module.

* * * * *